(12) United States Patent
Poon et al.

(10) Patent No.: US 10,598,241 B2
(45) Date of Patent: Mar. 24, 2020

(54) MULTI DEFLECTION CANTED COIL SPRINGS AND RELATED METHODS

(71) Applicant: BAL SEAL ENGINEERING, INC., Foothill Ranch, CA (US)

(72) Inventors: Daniel Poon, Foothill Ranch, CA (US); Jin Soo Kim, Foothill Ranch, CA (US); Farshid Dilmaghanian, Foothill Ranch, CA (US); Raul Magana, Foothill Ranch, CA (US)

(73) Assignee: Bal Seal Engineering, Inc., Foothill Ranch, CA (US)

(*) Notice: Subject to any disclaimer, the term of this patent is extended or adjusted under 35 U.S.C. 154(b) by 0 days.

(21) Appl. No.: 14/630,361

(22) Filed: Feb. 24, 2015

(65) Prior Publication Data

US 2015/0240900 A1 Aug. 27, 2015

Related U.S. Application Data

(60) Provisional application No. 61/945,042, filed on Feb. 26, 2014.

(51) Int. Cl.
*F16F 1/12* (2006.01)
*F16F 1/04* (2006.01)
(Continued)

(52) U.S. Cl.
CPC .............. *F16F 1/045* (2013.01); *F16B 17/00* (2013.01); *F16J 15/16* (2013.01); *F16J 15/3452* (2013.01); *F16B 2200/10* (2018.08)

(58) Field of Classification Search
CPC ..... F16F 1/045; F16F 1/12; F16F 1/127; F16J 15/16; F16J 15/3452; F16B 17/00;
(Continued)

(56) References Cited

U.S. PATENT DOCUMENTS

| 3,174,500 A | 3/1965 | Johnson et al. |
| 4,655,462 A * | 4/1987 | Balsells ............... F16J 15/3212 267/1.5 |

(Continued)

FOREIGN PATENT DOCUMENTS

| DE | 19807663 | 9/1999 |
| GB | 2194298 | 3/1988 |

(Continued)

OTHER PUBLICATIONS

Extended European Search Report on related EP application No. 15156802.9, dated Jul. 29, 2016, 10 pages.
(Continued)

*Primary Examiner* — Melody M Burch
(74) *Attorney, Agent, or Firm* — Klein, O'Neill & Singh, LLP

(57) ABSTRACT

Canted coil springs with a plurality of interconnected coils that can deflect in at least two different directions with respect to a centerline are disclosed. The ability to deflect in at least two different directions may be utilized in applications that include electrical/mechanical connectors and rotary/static seals. The ability to deflect in at least two different directions may bring increased benefits in terms of geometrical requirements, tolerances, spring orientation, and spring force.

8 Claims, 11 Drawing Sheets

(51) Int. Cl.
*F16J 15/34* (2006.01)
*F16J 15/16* (2006.01)
*F16B 17/00* (2006.01)
*F16F 1/06* (2006.01)

(58) Field of Classification Search
CPC .... F16B 21/18; F16B 21/186; F16B 2200/10; Y10T 403/7039
See application file for complete search history.

(56) References Cited

U.S. PATENT DOCUMENTS

| | | |
|---|---|---|
| 4,655,945 A | 4/1987 | Balsells |
| 4,678,210 A | 7/1987 | Balsells |
| 4,804,290 A | 2/1989 | Balsells |
| 4,805,943 A | 2/1989 | Balsells |
| 4,826,144 A | 5/1989 | Balsells |
| 4,830,344 A | 5/1989 | Balsells |
| 4,872,710 A | 10/1989 | Konecny et al. |
| 4,876,781 A | 10/1989 | Balsells |
| 4,893,795 A | 1/1990 | Balsells |
| 4,907,788 A | 3/1990 | Balsells |
| 4,915,366 A | 4/1990 | Balsells |
| 4,934,666 A * | 6/1990 | Balsells .......... F16F 1/045 174/366 |
| 4,961,253 A | 10/1990 | Balsells |
| 4,964,204 A | 10/1990 | Balsells |
| 4,974,821 A | 12/1990 | Balsells |
| 5,072,070 A | 12/1991 | Balsells |
| 5,079,388 A | 1/1992 | Balsells |
| 5,091,606 A | 2/1992 | Balsells |
| 5,108,078 A | 4/1992 | Balsells |
| 5,117,066 A | 5/1992 | Balsells |
| 5,134,244 A | 7/1992 | Balsells |
| 5,139,243 A | 8/1992 | Balsells |
| 5,139,276 A | 8/1992 | Balsells |
| 5,149,642 A | 9/1992 | Mazur et al. |
| 5,160,122 A | 11/1992 | Balsells |
| 5,161,806 A | 11/1992 | Balsells |
| 5,203,849 A | 4/1993 | Balsells |
| 5,239,737 A | 8/1993 | Balsells |
| 5,265,890 A * | 11/1993 | Balsells .......... F16F 3/12 277/467 |
| 5,358,224 A | 10/1994 | Balsells |
| 5,411,348 A | 5/1995 | Balsells |
| 5,474,309 A | 12/1995 | Balsells |
| 5,503,375 A * | 4/1996 | Balsells .......... F16F 1/045 267/167 |
| 5,542,682 A | 8/1996 | Goldstein et al. |
| 5,545,842 A | 8/1996 | Balsells |
| 5,570,719 A | 11/1996 | Richards et al. |
| 5,575,487 A | 11/1996 | Balsells |
| 5,599,027 A | 2/1997 | Balsells |
| 5,709,371 A | 1/1998 | Balsells |
| 5,791,638 A * | 8/1998 | Balsells .......... F16F 3/04 267/167 |
| 5,979,904 A | 11/1999 | Balsells |
| 5,984,316 A | 11/1999 | Balsells |
| 5,992,856 A | 11/1999 | Basells et al. |
| 6,050,572 A | 4/2000 | Balsells et al. |
| 6,161,838 A | 12/2000 | Balsells |
| 6,264,205 B1 | 7/2001 | Balsells |
| 6,641,141 B2 | 11/2003 | Schroeder |
| 6,672,565 B2 | 1/2004 | Russell |
| 6,835,084 B2 | 12/2004 | Poon et al. |
| 7,055,812 B2 | 6/2006 | Balsells |
| 7,210,398 B2 | 5/2007 | Balsells |
| 7,464,750 B2 | 12/2008 | Schapel et al. |
| 7,538,289 B2 | 5/2009 | Carroll |
| 7,722,415 B2 | 5/2010 | Changsrivong |
| 7,914,315 B2 | 3/2011 | Kuhn et al. |
| 7,914,351 B2 | 3/2011 | Balsells et al. |
| 7,985,105 B2 | 7/2011 | Balsells |
| 8,052,459 B2 | 11/2011 | Smith et al. |
| 8,096,559 B2 | 1/2012 | Cook |
| 8,096,842 B2 | 1/2012 | Poon et al. |
| 8,308,167 B2 | 11/2012 | Balsells et al. |
| 8,328,202 B2 | 12/2012 | Foster et al. |
| 8,336,864 B2 | 12/2012 | Noh |
| 8,382,532 B2 | 2/2013 | Sjostedt et al. |
| 8,491,346 B2 | 7/2013 | Sjostedt et al. |
| 8,544,850 B2 | 10/2013 | Balsells et al. |
| 8,561,274 B2 | 10/2013 | Balsells |
| 8,590,867 B2 | 11/2013 | Leon |
| 8,684,362 B2 | 4/2014 | Balsells et al. |
| 9,004,805 B2 | 4/2015 | Changsrivong et al. |
| 9,194,497 B2 | 11/2015 | Rastegar |
| 9,234,591 B2 | 1/2016 | Dilmaghanian et al. |
| 9,267,526 B2 | 2/2016 | Balsells |
| 9,273,742 B2 | 3/2016 | Balsells et al. |
| 9,284,970 B2 | 3/2016 | Dilmaghanian et al. |
| 9,285,034 B2 | 3/2016 | Balsells et al. |
| 9,312,630 B2 | 4/2016 | Huang |
| 9,357,684 B2 | 5/2016 | Foster |
| 9,482,255 B2 | 11/2016 | Changsrivong et al. |
| 9,500,211 B2 | 11/2016 | Changsrivong |
| 9,518,626 B2 | 12/2016 | Balsells et al. |
| 9,534,625 B2 | 1/2017 | Balsells |
| 9,677,587 B2 | 6/2017 | Changsrivong et al. |
| 2002/0122690 A1 | 9/2002 | Poon et al. |
| 2003/0096526 A1 | 5/2003 | Balsells |
| 2004/0070128 A1 | 4/2004 | Balsells |
| 2006/0228166 A1 | 10/2006 | Balsells |
| 2009/0289418 A1 | 11/2009 | Cook |
| 2010/0237565 A1 | 9/2010 | Foster |
| 2010/0279558 A1 | 11/2010 | Leon et al. |
| 2010/0289198 A1 | 11/2010 | Balsells et al. |
| 2011/0006486 A1 | 1/2011 | Niknezhad |
| 2011/0062640 A1 | 3/2011 | Leon |
| 2012/0098179 A1 | 4/2012 | Jaster |
| 2013/0043661 A1 | 2/2013 | Binder et al. |
| 2013/0149031 A1 | 6/2013 | Changsrivong et al. |
| 2014/0130329 A1 | 5/2014 | Changsrivong et al. |
| 2014/0162487 A1 | 6/2014 | Frederick et al. |
| 2014/0259617 A1 | 9/2014 | Kompa et al. |
| 2014/0312570 A1 | 10/2014 | Foster |
| 2014/0378008 A1 | 12/2014 | Young et al. |
| 2015/0240900 A1 | 8/2015 | Poon et al. |
| 2015/0316115 A1 | 11/2015 | Carter |
| 2016/0047473 A1 | 2/2016 | Foster et al. |
| 2016/0076568 A1 | 3/2016 | Dilmaghanian et al. |
| 2016/0204557 A1 | 7/2016 | Kim |
| 2016/0223086 A1 | 8/2016 | Balsells et al. |
| 2016/0265574 A1 | 9/2016 | Ghasiri |
| 2017/0172018 A1 | 6/2017 | Dilmaghanian et al. |
| 2017/0261108 A1 | 9/2017 | Soler et al. |
| 2017/0328474 A1 | 11/2017 | Balsells |
| 2017/0352984 A1 | 12/2017 | Changsrivong et al. |
| 2017/0373425 A1 | 12/2017 | Rust |
| 2018/0112778 A1 | 4/2018 | Dilmaghanian et al. |
| 2018/0119857 A1 | 5/2018 | Balsells |

FOREIGN PATENT DOCUMENTS

| | | |
|---|---|---|
| JP | S48-009286 | 2/1973 |
| JP | S61-165035 A | 7/1986 |
| JP | S63-210468 A | 9/1988 |
| JP | H04-105397 A | 4/1992 |
| JP | H11-509606 A | 8/1999 |
| JP | 2001-204630 A | 7/2001 |
| JP | 2012-248495 A | 12/2012 |
| JP | 2013-101970 A | 5/2013 |
| WO | WO 03067713 | 8/2003 |
| WO | WO 2004/031595 | 4/2004 |
| WO | WO 2010/129293 | 11/2010 |

OTHER PUBLICATIONS

Office Action on corresponding JP application No. 2015-037235, dated Aug. 14, 2018.

* cited by examiner

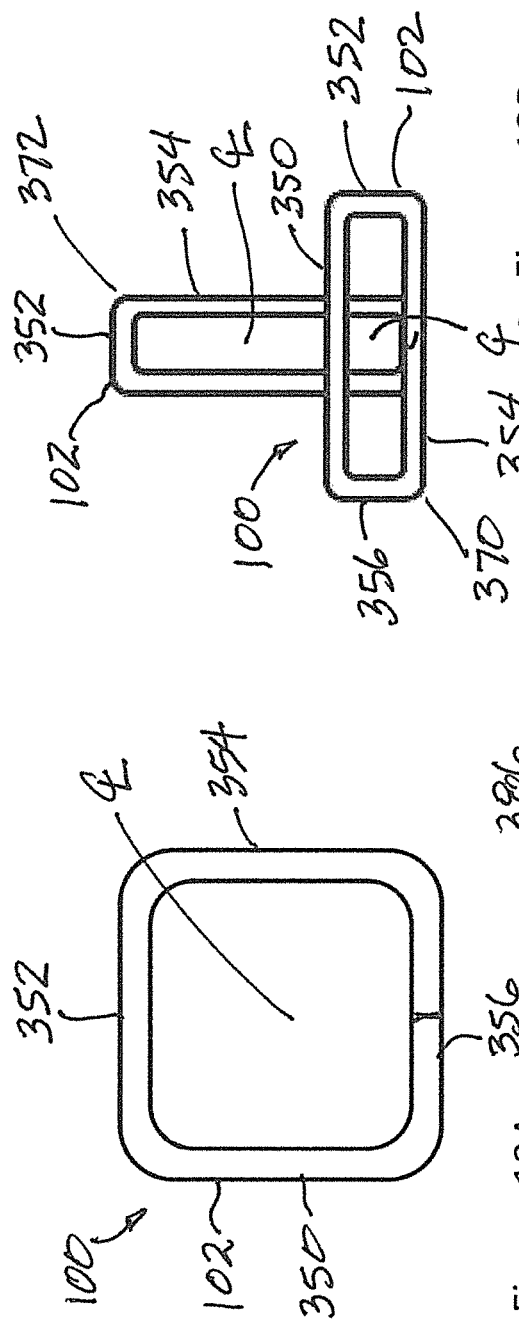
Figure 12A
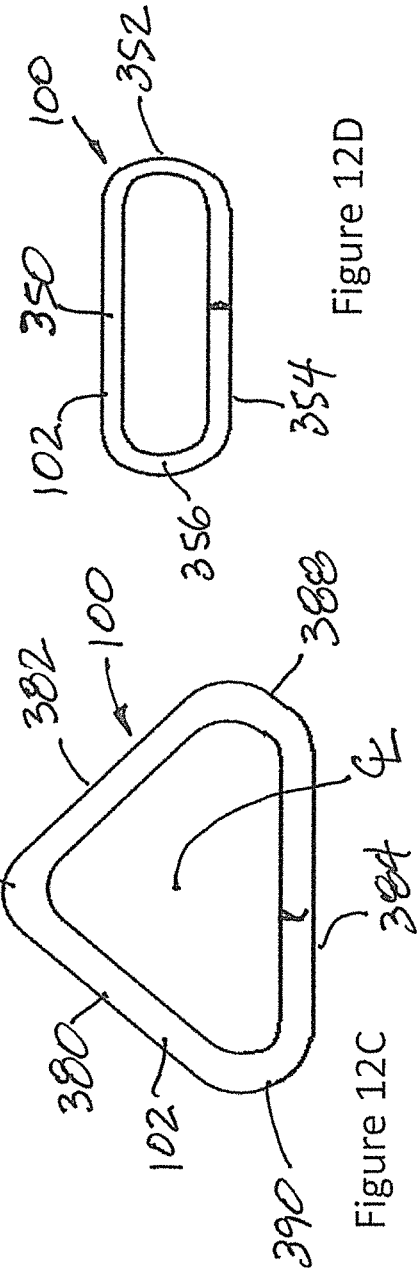
Figure 12B
Figure 12C
Figure 12D

MULTI DEFLECTION CANTED COIL SPRINGS AND RELATED METHODS

FIELD OF ART

The present disclosure generally relates to canted coil springs and related methods, and more particularly, to designs, applications, and methods related to canted coil springs that can deflect in at least two directions perpendicular to a centerline of the spring.

BACKGROUND

A conventional canted coil spring comprises a plurality of coils interconnected with one another wherein the coils are disposed at a preselected angle with respect to a centerline. The preselected angle causes said plurality of coils to have an elliptical shape when viewed in the direction of the centerline. The coils each comprises a major axis and a minor axis, wherein coil deflection only occurs along said minor axis and typically only along the preselected angle to a further canting position. The canted nature of the canted coil spring allows for deflection of the coils along the minor axis when a force perpendicular in direction to the centerline is applied. The deflection force of the canted coil spring is relatively constant with respect to the deflection amount of the plurality of coils along a range of deflection, also known as working deflection range. Such feature brings significant advantages when applied in applications such as rotary/static seals and electrical connectivity. Also, due to the various sizes of canted coil springs, applications using a canted coil spring may achieve compact designs while producing the desired results.

However, the conventional canted coil spring faces a limitation when a force is applied along the major axis, perpendicular to the deflection force discussed above, of the coils since the coils cannot deflect along the major axis. Generally, an application using a canted coil spring requires a spring groove or a spring cavity to position the canted coil spring. Due to the limitation that the canted coil spring cannot deflect along the major axis of the coils, a spring groove width that is larger than the major axis of the coils is typically required.

SUMMARY

The invention introduced herein presents a canted coil spring that can deflect in at least two directions essentially perpendicular to a centerline. The versatile ability to deflect in at least two directions is possible by setting each coil to at least two preselected angles along at least two different planes with respect to the centerline by canting, bending, or sequencing the coils, among others. Such capability of the canted coil spring may bring advantages for applications that are currently using a conventional canted coil spring with a single deflection characteristic, such as electrical connectors and rotary/static seals using conventional canted coil springs. Due to the conventional canted coil spring being deflectable only in one direction, it faces limitations such as stricter geometrical requirements, tighter tolerances, and presence of shuttling or axial play, and less consistent spring force. The canted coil spring that deflects in at least two directions of the present disclosure may resolve such limitations and bring increased benefits when used in the mentioned applications.

Aspects of the present disclosure include a canted coil spring comprising a plurality of interconnected coils with one another in a spaced-apart relationship and disposed at a preselected angle with respect to a centerline of said canted coil spring; wherein each coil of said plurality of interconnected coils may deflect in at least two directions essentially perpendicular to said centerline.

The canted coil spring may deflect in at least two directions independently of one another.

The canted coil spring can have two ends joined to form a spring ring. The two ends can be welded together or can overlap so that the two ends intertwine.

The canted coil spring wherein at least one coil of the plurality of interconnected coils can have an elliptical shape.

The canted coil spring wherein the plurality of interconnected coils can further be disposed at another preselected angle with respect to an axis that is essentially perpendicular to the centerline.

The canted coil spring wherein at least a portion of at least one coil can be bent at an angle to the centerline.

The canted coil spring wherein the plurality of interconnected coils can have alternating canting angles of different values, directions, or both with respect to the centerline.

The canted coil spring wherein at least one elliptical coil can have a major axis and a minor axis that indicates the direction of deflection.

The canted coil spring can function as an electromagnetic interference shielding and grounding.

The canted coil spring wherein at least one coil of the plurality of coils can have a rectangular shape or a square shape.

The canted coil spring wherein at least one coil of the plurality of coils can have a polygonal shape.

The canted coil spring wherein at least one coil of the plurality of coils can have a triangular shape.

The canted coil spring wherein at least two adjacent coils can be both rectangular shape and wherein one coil with the rectangular shape can be rotated 90 degrees relative to the other coil with the rectangular shape.

A still further feature of the present disclosure is a connector assembly comprising a first body and a second body wherein the second body is inserted into the first body; wherein at least one of the first body or the second body comprises at least one canted coil spring installed within at least one spring groove; said canted coil spring comprising: a plurality of interconnected coils in a spaced-apart relationship and disposed at a preselected angle with respect to a centerline of said canted coil spring; wherein each coil of said plurality of coils may deflect in at least two directions essentially perpendicular to said centerline.

The connector assembly wherein the canted coil spring can be constrained within a spring groove.

The connector assembly can include metallic materials and can function as an electro-mechanical connector.

The connector assembly wherein the canted coil spring can function as an electromagnetic interference shielding and grounding.

A yet further feature of the present disclosure is a seal assembly comprising a sealing component and a spring energizer; wherein the sealing component comprises a sealing lip; wherein the spring energizer is within a spring cavity and energizes the sealing lip; wherein the spring energizer is a canted coil spring comprising: a plurality of coils interconnected with one another in a spaced-apart relationship and disposed at a preselected angle with respect to a centerline of said canted coil spring; wherein each coil of said plurality of coils may deflect in at least two directions essentially perpendicular to said centerline.

The seal assembly can further comprise a retaining member engaging a sealing component. The sealing component can comprise an inside flange, an outside flange, and a center channel section located between the inside flange and the outside flange.

Methods of making and of using canted coil springs described herein.

Yet another aspect of the present disclosure is a method of making a canted coil spring comprising bending or rolling a wire to create a plurality of coils that are interconnected with one another in a spaced apart relationship; tilting each of the plurality of coils relative to a coil centerline at a first location to a first preselected canting angle; and tilting each of the plurality of coils relative to the coil centerline at a second location to a second preselected canting angle with is different from the first location.

The method further comprising connecting two ends of a canted coil spring to form a spring ring.

The method wherein each coil can have coil properties and/or shapes discussed elsewhere herein.

Methods of making and of using connector assemblies described herein.

A still further aspect of the present disclosure is a method for using a canted coil spring. The canted coil spring comprising a plurality of coils interconnected with one another in a spaced-apart relationship and disposed at a first preselected angle with respect to a centerline of said canted coil spring and disposed at a second preselected angle with respect to the centerline of said canted coil spring; wherein each coil of said plurality of coils is deflectable in at least two different directions generally perpendicular to said centerline. The method comprising placing the canted col spring into a spring groove inside a bore of a housing or on an exterior surface of a pin and then inserting the pin into the bore of the housing.

Methods of making and of using seal assemblies described herein.

The method can comprise placing the canted col spring into a spring cavity of a seal element comprising an inside flange, an outside flange, and a center channel section located between the inside flange and the outside flange.

A still yet further feature is a canted coil spring comprising: a plurality of coils interconnected with one another in a spaced-apart relationship and disposed at a first preselected angle with respect to a centerline of said canted coil spring and disposed at a second preselected angle with respect to the centerline of said canted coil spring; wherein each coil of said plurality of coils is deflectable in at least two different directions generally perpendicular to said centerline.

The canted coil spring wherein the plurality of coils can be deflectable in at least two directions independently of one another.

The canted coil spring wherein two ends can be joined to form a spring ring.

The canted coil spring wherein at least one coil of the plurality of coils can have an elliptical shape.

The canted coil spring wherein the first preselected angle can be between about 35 degrees and about 89 degrees.

The canted coil spring wherein at least a portion of at least one coil can be bent at an angle to the centerline to be disposed at a second preselected angle.

The canted coil spring wherein the plurality of coils can be alternating in canting angles with respect to the centerline.

The canted coil spring wherein the at least one coil with the elliptical shape can have a major axis and a minor axis that indicates the direction of deflection.

The canted coil spring can further comprise a housing with a housing groove in an electromagnetic interference shielding and grounding application.

The canted coil spring where the plurality of coils can have different shapes that alternate along a spring length.

The canted coil spring can be in a spring ring configuration with a center, an inside diameter, and an outside diameter. The coils of the spring ring can have a centerline. The coils can deflect along a first direction perpendicular to the centerline. The coils can deflect along a second direction, different from the first direction, perpendicular to the centerline. The first direction can align with the first preselected angle with respect to the centerline and the second direction can align with the second preselected angle with respect to the centerline.

The canted coil spring wherein a bent section can be disposed along the outside diameter of the spring ring. The bent section can be disposed away from the outside diameter of the spring ring, such as somewhere between the inside diameter and the outside diameter.

Yet another aspect of the present disclosure is a connector assembly comprising a first body and a second body wherein the second body is inserted into the first body; at least one of the first body or the second body comprises a canted coil spring installed within a spring groove; the canted coil spring comprising a plurality of coils interconnected with one another in a spaced-apart relationship and disposed at a preselected angle with respect to a centerline of said canted coil spring; and wherein each coil of said plurality of coils are deflectable in at least two different directions each generally perpendicular to said centerline.

The connector assembly wherein the second body can be a pin or piston.

The connector assembly wherein the first body can be a housing comprising a bore with or without an end wall.

The connector assembly wherein the canted coil spring can be constrained within the spring groove.

The connector assembly wherein the spring groove can comprise two sidewalls and a bottom wall located therebetween. The two sidewalls can be generally parallel to one another. The two sidewalls can taper or be angled relate to one another. The pin can include a tapered insertion end. The pin can be solid or hollow with a lumen.

The connector assembly wherein the canted coil spring can be biased against the two sidewalls and between the bottom wall and a surface of the first body or the second body. If the spring groove is located on the second body, the surface is with the first body. If the spring groove is located in a bore of the first body, the surface is with the second body. Wherein the coils of the canted coil spring are deflected along two different directions generally perpendicularly to the centerline when the coils are biased against the two sidewalls of the spring groove and between the bottom wall and a surface of the first body or the second body.

The connector assembly wherein at least five coils of the plurality of coils each can include a bent section to form a second preselected angle with respect to the centerline of said canted coil spring, which is different from a first preselected angle with respect to the centerline of said canted coil spring.

The connector assembly can comprise an outside multi deflection canted coil spring in electrical communication with a first metal shield and a second metal shield and the canted coil spring installed within the spring groove can be an inside multi deflection canted coil spring providing electrical communication between a pin and a metal core. An non-conducting outer housing can be provided outside the first body and a different non-conducting outer housing can be provided outside the second body.

The connector assembly can comprise a plurality of insulating elements stacked in alternating sequence with a plurality of electrically conducting ring contact elements.

Yet another feature of the present disclosure is a seal assembly comprising a sealing component and a spring energizer; wherein the sealing component comprises an outside flange, an inside flange comprising a sealing lip, and a center channel section located between the inside flange and the outside flange and together define a spring cavity; wherein the spring energizer is positioned in the spring cavity and energizes the inside flange and the outside flange; wherein the spring energizer is a canted coil spring comprising: a plurality of coils interconnected with one another in a spaced-apart relationship and disposed at a first preselected angle with respect to a centerline of said canted coil spring and disposed at a second preselected angle with respect to the centerline of said canted coil spring; and wherein each coil of said plurality of coils are deflectable in at least two different directions generally perpendicular to said centerline.

The seal assembly can further comprise a retaining member engaging the sealing component.

DESCRIPTION OF DRAWINGS

These and other features and advantages of the present devices, systems, and methods will become appreciated as the same becomes better understood with reference to the specification, claims and appended drawings wherein:

FIGS. 12A-12D show end views of four different multi deflection canted coil spring lengths or spring rings each with different coil shape configuration.

DETAILED DESCRIPTION

Figure 1A:
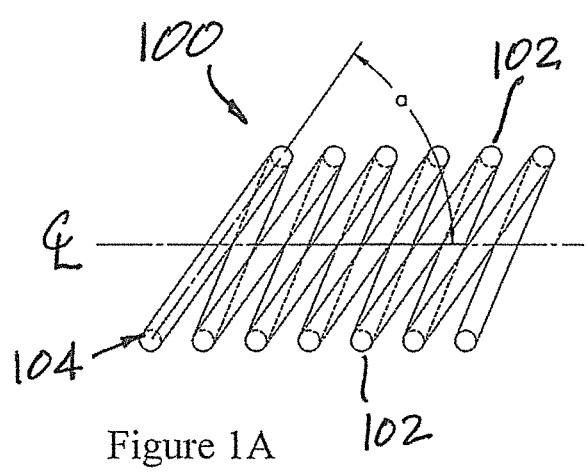
FIGS. 1A-1B show a canted coil spring length with two different preselected angles with respect to a centerline in side and perspective views.

The detailed description set forth below in connection with the appended drawings is intended as a description of the presently preferred embodiments of canted coil springs and canted coil spring applications provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Canted coil springs of the present disclosure can deflect along more than one direction perpendicular to a centerline through the coils of the canted coil spring. For example, the canted coil springs of the present disclosure can deflect along the minor axis of the coils as well as along at least another direction perpendicular to the centerline through the coils, different from the direction along the minor axis. Thus, the canted coil springs of the present disclosure may be considered canted coil springs with multi deflection canted coils. The canted coil springs of the present disclosure may be made from any number of metallic wire materials and alloys and may include cladding, platings, or multi-layers, such as having one or more outer layers surrounding a metallic core, which can be hollow or solid. In an example, the disclosed canted coil springs can deflect in at least two different directions essentially perpendicular to the centerline. If each deflection direction is along a plane, the canted coil springs of the present disclosure can deflect along two different planes. Such capability can decrease groove width of a spring groove or spring cavity that the spring is positioned in, can provide self-retention of the canted coil spring within the spring groove, and as a result, allows for a more compact design of comparable applications. Also due to the capability of the present canted coil springs being able to deflect along more than one direction perpendicular to the centerline, spring grooves and spring cavities that the present canted coil springs are used with do not require tight tolerances during manufacturing compared to conventional single canting direction canted coil springs.

As an example, in an electrical connector application involving a housing, a pin or piston, and a spring groove incorporated in either the housing, the pin/piston, or both, a canted coil spring that can deflect in at least two directions perpendicular to the centerline may withstand a greater amount of mechanical shock while maintaining groove retention than prior art canted coil springs that only deflect in one direction. Furthermore, insertion and removal forces as well as conductance reliability may be increased due to no axial play of springs and more contact points, as further discussed below.

In another example, in a rotary/static seal assembly involving a seal element having a spring cavity defined by an inside flange, an outside flange, and a center channel section, the canted coil spring that can deflect in at least two directions inside the spring cavity may provide consistent spring force load location. Also, utilization of coil width retention capability may prevent shuttling of the seal elements.

As used herein, the canted coil spring that can deflect in at least two directions perpendicular to the centerline will be referred to as a "multi deflection canted coil spring" or "MDCCS" for short. Further, while the springs of the present disclosure can be used in electro-mechanical applications, it is understood that the multi deflection canted coil springs described herein can be used in mechanical applications without any electrical conductivity.

Figure 1B:
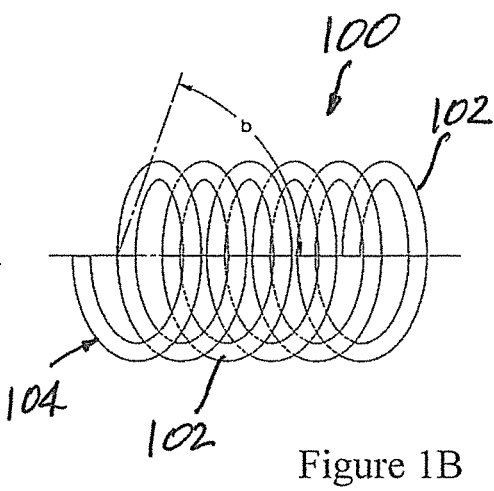

With reference now to FIGS. 1A-1C, a MDCCS 100 in a spring length 104 comprising a plurality of interconnected coils 102 are shown comprising at least two different preselected canting angles with respect to a centerline $C_L$ of the plurality of coils. FIG. 1A shows the canted coil spring 100 in a front view with the plurality of coils 102 in a first preselected angle a that is disposed with respect to the centerline $C_L$. For example, after forming the spring length 104, the coils have a first preselected angle a that is disposed with respect to the centerline. The first preselected angle a allows deflection of each coil 102 of the plurality of coils in a direction perpendicular to the centerline. Thus, angle a can be smaller when deflecting the coils 102 in the direction perpendicular to the centerline. The plurality of interconnected coils 102 can be said to deflect from a first preselected canting angle a to a canted angle a', which is smaller in value than the first preselected canting angle a. In other words, as the coils are deflected, the angle a' that the plurality of coils are deflected to is smaller than the angle a and the direction of canting for each coil defines a canting plane, which may be called a first canting plane. In practice, the coils 102 can deflect when a force is exerted on the outside diameter of the spring while supporting the inside diameter of the spring, on the inside diameter of the spring while supporting the outside diameter of the spring, or both simultaneously. When the deflection force is removed, the coils return to the first canting angle a unless the coils are destroyed or plastically deformed. Exemplary range for the first preselected canting angle a can range from about 35 degrees to about 89 degrees from the centerline. Exemplary range for the second preselected canting angle b can range from about 45 degrees to about 89 degrees from the centerline.

Figure 8A:
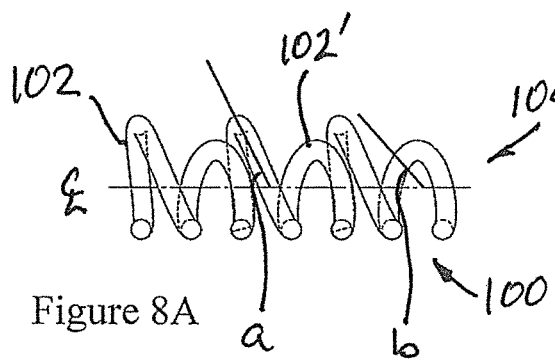
FIGS. 8A-8B show a multi deflection canted coil spring in a length wherein the coils follow a sequence of alternating canting angles.
Figure 8B:
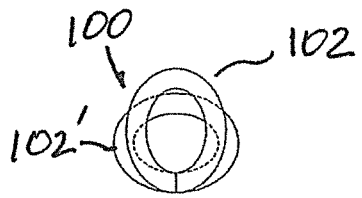

FIG. 1B shows the canted coil spring 100 in a top view with the coils 102 of the spring length 104 having a second preselected angle b that may be disposed with respect to the centerline $C_L$. The second preselected angle b can be formed by canting the coils, bending the coils, or sequencing the coils to allow the coils to deflect in another direction essentially perpendicular to the centerline. For example, the coils 102 in FIGS. 8A and 8B are shown with different sequence of canting. In some examples, coils having different canting angles are coiled in repeating patterns. The second preselected angle b can be smaller when deflecting the coils 102 in a second direction perpendicular to the centerline. The coils 102 can be said to deflect from the preselected canting angle b to a canted angle b', which is smaller in value than the second preselected canting angle b. The direction of canting for each coil from angle b to a smaller angle b' defines a canting plane, which may be called a second canting plane and is different form the first canting plane. In contrast, prior art canted coil springs with only one preselected canting angle cannot cant in a second canting direction and does not have a second canting plane. The combination of the first preselected angle a and the second preselected angle b, both with respect to the centerline, defines a multi deflection canted coil spring 100 of the present disclosure. The spring 100 may deflect in at least two directions independently of one another.

Figure 2A:
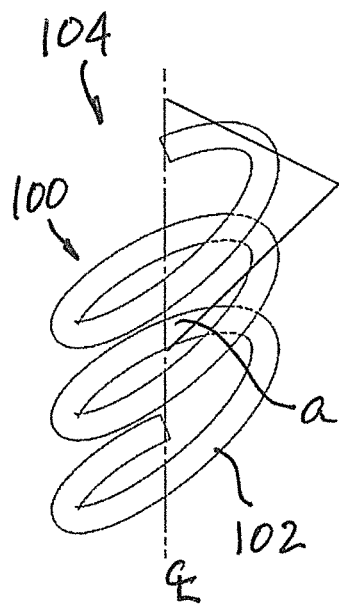
FIGS. 2A-2C show a multi deflection canted coil spring in a length that comprises two preselected angles with respect to a centerline in side, end radial profile, and perspective views.
Figure 2B:
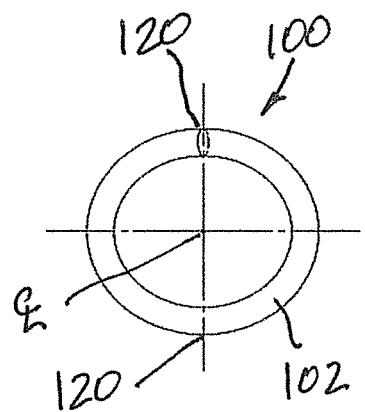
Figure 2C:
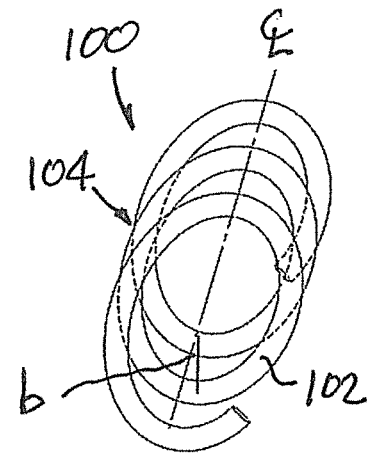

FIGS. 2A-2C show different views of the MDCCS 100 in a length 104. FIG. 2A shows the multi deflection canted coil spring 100 in a length 104 wherein each coil 102 of the plurality of coils is canted at two preselected angles a and b with respect to the centerline $C_L$ of said multi deflection canted coil spring 100. For example, the coils 102 of the canted coil spring 100 can be canted along a preselected angle a and then canted again along another angular position relative to the first orientation to form a second preselected angle b. The two preselected angles a and b allow deflection of the coils in at least two directions essentially perpendicular to the centerline $C_L$.

FIG. 2B shows an end view of an individual coil 102 of the multi deflection canted coil spring 100 in a length. FIG. 2C shows an isometric view of said multi deflection canted coil spring 100 in a length 104. The different directions of deflection advantageously provide the novel spring 100 with multi deflection capability. The coils 102 can be constrained and retained within a spring groove or a spring cavity and deflected along different directions, as opposed to a single canting direction for conventional canted coil springs, to provide increased stability and operability. Typically, a length 104 of canted coil spring 100 is formed into an annular shape by welding two ends of the spring to from a spring ring so that it can be utilized in applications such as, but not limited to, electrical connectors and seal assemblies with annular shapes. The spring 100 may deflect in at least two directions independently of one another.

With reference again to FIGS. 1A and 2B, when the coils 102 are canted by subjecting them to a deflecting force generally perpendicular to the centerline $C_L$, the coils are further canted or slanted so that the coils are now at angle a' with respect to the centerline, which is smaller than angle a. When viewing the coils from an end view, such as from the perspective of FIG. 2B, the coils, when deflected, are canted or slanted away from the viewer so that the opening space inside the coil wire of the coil 102 appears more elliptical than when not subjected to the deflection force. This canting dynamic is also true when the coils are deflected along another direction, such as when canting the coils from angle b (FIG. 1B) to angle b'. This general description is also applicable for other multi deflection canted coil springs 100 discussed elsewhere herein.

Figure 3:
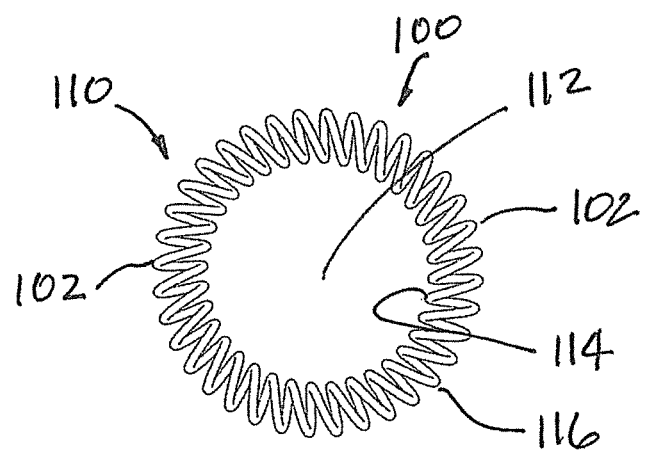
FIG. 3 shows a multi deflection canted coil spring in an annular shape by joining two ends of a spring length that comprises the two preselected angles with respect to a centerline.

FIG. 3 shows a spring ring 110 formed by joining two ends of a spring length 104 of a MDCCS 100 of FIGS. 2A-2C to form an annular shape having a spring center 112, a spring inside diameter (ID) 114, and a spring outside diameter (OD) 116. The sizes of the spring ID, spring OD, coil height and coil width can be selected depending on the application. The preselected canting angles a and b and canting orientation relative to one another and to the spring coil centerline can also be selected depending on the application. For example, the various spring characteristics can be selected based on high insertion force for inserting a piston into a bore of a housing, high removal force to remove the piston from the bore, high holding force to retain the piston within the bore, based on locking, based on size or space of the operating environment, and/or based on temperature conditions of the operating environment, among others.

Thus, an aspect of the present disclosure is understood to include a multi deflection canted coil spring 100 comprising a plurality of interconnected coils or a plurality of coils that are interconnected 102 with a coil centerline $\mathcal{C}_L$ and wherein each coil has a first preselected canting angle a with respect to the centerline and a second preselected canting angle b with respect to the centerline. The coils can cant or deflect when a force is applied perpendicular to the centerline $\mathcal{C}_L$ to cant the spring along angle a and along angle b to produce canting angles a' and b' and wherein the value of angle a' is smaller than the value of angle a and the value of angle b' is smaller than the value of angle b and the coils are further canted than before the deflection force is applied. The ends of the spring length 104 of the canted coil spring 100 can be connected to form a spring ring.

Figure 4A:
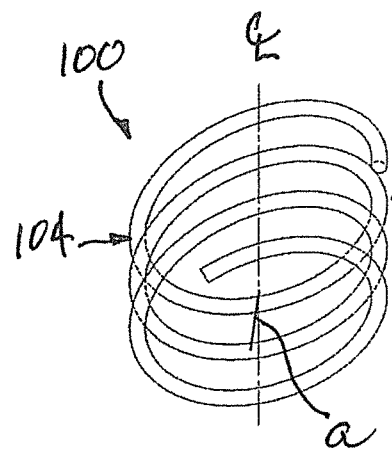
FIGS. 4A-4C show an alternative shape of a multi deflection canted coil spring in a length that comprises two preselected angles with respect to a centerline in perspective, end radial profile, and perspective views.
Figure 4B:
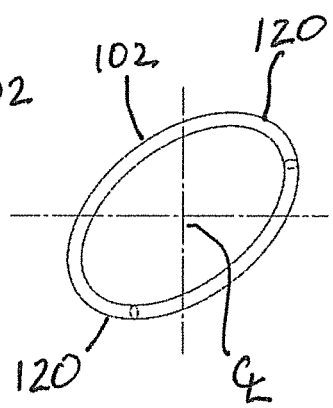
Figure 4C:
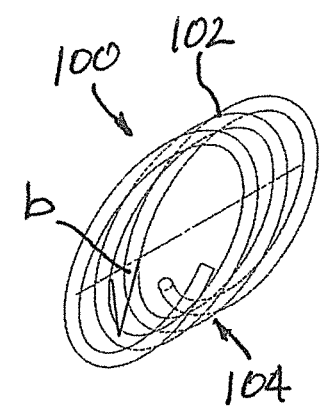

FIGS. 4A-C show a spring length 104 of an alternate multi deflection canted coil spring or MDCCS 100 provided in accordance with further aspects of the present invention. FIG. 4A shows the alternative shape of the multi deflection canted coil spring 100 wherein each coil 102 is canted along a first preselected angle a with respect to a centerline and a second preselected angle b also with respect to the centerline. Each coil of the plurality of coils 102 of the canted coil spring 100 can be canted along one direction at a preselected angle a and then canted again along another angular position from the first orientation at a second preselected angle b. FIG. 4B shows an end view of an individual coil 102 of the alternative shape spring 100, which is essentially a skewed elliptical shape of each coil 102 wherein the contact area 120 of each coil 102, assuming against a generally square or rectangular spring groove, is also slightly shifted as compared to the contact area 120 of the canted coil spring 100 shown in FIG. 2B. FIG. 4C shows an isometric view of the alternative shape canted coil spring length 104 of the multi deflection canted coil spring 100 of FIG. 4A. The spring 100 may deflect in at least two directions independently of one another.

Figure 5:
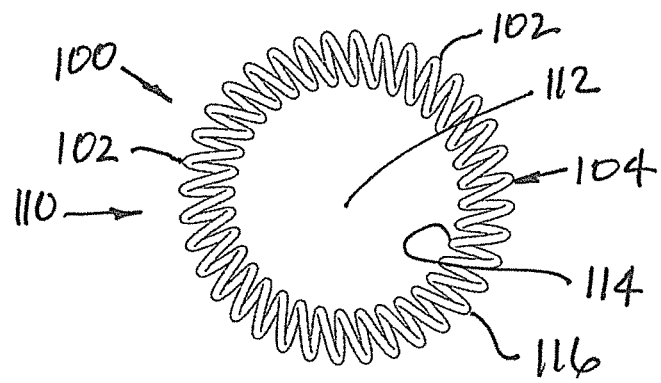
FIG. 5 shows an alternative shape of a multi deflection canted coil spring in an annular shape by joining two ends of a spring length that comprises the two preselected angles with respect to a centerline.

FIG. 5 shows a spring ring 110 formed by joining two ends of the spring length 104 of a MDCCS 100 of FIGS. 4A-4C to form an annular shape having a spring center 112, a spring inside diameter (ID) 114, and a spring outside diameter (OD) 116. The sizes of the spring ID, spring OD, coil height and coil width can be selected depending on the application. The preselected canting angles a and b and canting orientation relative to one another and to the spring coil centerline can also be selected depending on the application. For example, the various spring characteristics can be selected based on high insertion force for inserting a piston into a bore of a housing, high removal force to remove the piston from the bore, high holding force to retain the piston within the bore, based on locking, based on size or space of the operating environment, and/or based on temperature conditions of the operating environment, among others.

Thus, an aspect of the present disclosure is understood to include a multi deflection canted coil spring 100 comprising a plurality of interconnected coils 102 having a coil centerline $\mathcal{C}_L$ and wherein each coil has a first preselected canting angle a with respect to a centerline and a second preselected canting angle b with respect to the centerline. Preselected angles a and b of the present canted coil spring 100 are different than the preselected angles a and b of the canted coil spring 100 of FIGS. 2A-2C, which is understood to have different angle a's, different angle b's, or both angles a's and b's. The coils can cant or deflect when a force is applied perpendicular to the centerline $\mathcal{C}_L$ to cant the coils of the spring 100 along angle a and along angle b to produce canting angles a' and b' and wherein the value of angle a' is smaller than the value of angle a and the value of angle b' is smaller than the value of angle b and the coils are further canted than before the deflection force is applied. The ends of the spring length 104 of the canted coil spring 100 can be connected to form a spring ring.

Figures 6A, 6B:
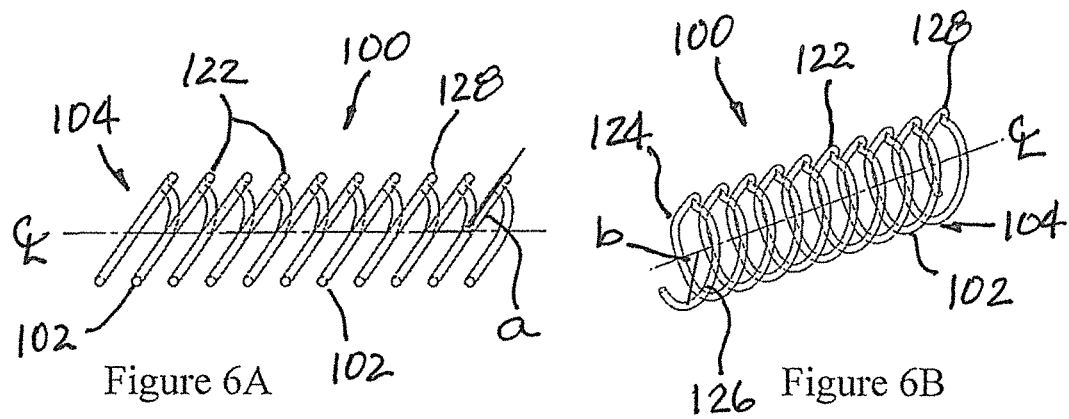
FIGS. 6A-6B show a multi deflection canted coil spring in a length wherein at least some of the coils are bent in side and perspective views.

FIGS. 6A-6B show a spring length 104 of a multi deflection canted coil spring 100 provided in accordance with further aspects of the present disclosure. In an example, each coil 102 of the interconnected coil has a bend 128 at a bent section 122. FIG. 6A shows the multi deflection canted coil spring 100 wherein each coil 102, initially canted by a first preselected angle a with respect to the centerline $\mathcal{C}_L$, is bent to establish a second preselected angle b with respected to the centerline $\mathcal{C}_L$. In other words, after the coils 102 are canted, a first part 124 of each coil 102 stays fixed while a second part 126 of each coil is bent at the bent section 122 to form the second preselected angle b with respect to the centerline $\mathcal{C}_L$. The initial canting of the coils 102 at the first preselected angle a accomplishes a first direction of deflection, and the bending of the coils 102 at the bent sections 122 accomplishes a second preselected angle of deflection b. Said differently, the deflection of the coils 102 by bending different sections of each coil yields a second preselected angle b and a different force vector applied in a direction perpendicular to the centerline will cause the coils to cant to take on angle b'. Thus, formation of the second preselected angle b of the present spring 100 does not require further deforming the coils 102, only bending different sections of each coil 102. Also similar to the springs 100 of previous figures, the multi deflection canted coil spring 100 of the present embodiment has a plurality of coils 102 and wherein each coil has a bend 128 at a bent section 122 to allow the coil to deflect in at least two directions with respect to the centerline $\mathcal{C}_L$. The location of each bent section 122 on each coil 102 is generally the same within a small tolerance so that the coils can deflect generally the same way when a same contact force is applied. The coils can also deflect along the two direction independently.

Figure 7:
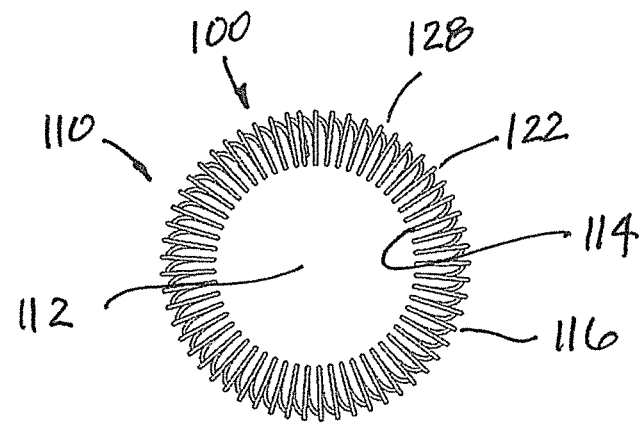
FIG. 7 shows a multi deflection canted coil spring in an annular shape by joining two ends of a spring length wherein at least some of the coils are bent.

FIG. 6B shows an isometric view of the multi deflection canted coil spring 100 of FIG. 6A wherein each coil has a bend 128. The canted coil spring 100 comprises a plurality of interconnected coils 102 and wherein each coil 102 is canted relative to a coil centerline to form a first preselected canting angle a and wherein each coil is bent at a bent section 122 to form a second preselected canting angle b that can deflect to yield coils with canting angle b'. The spring length 104 can also be formed into an annular shape spring ring 110 as shown in FIG. 7 for use in one of several mentioned applications. As shown, the bent sections 122 are generally located along the outside diameter 116 of the spring ring 110. In other examples, the bent section 122 can be located away from the outside diameter 116 of the spring ring, for example at a location between the inside diameter and the outside diameter. The relative locations of the bent sections 122 when forming the spring ring 110 can create different sets of preselected canting angles a and b. For example, the arc angle between where two contacts can cause the coils to cant along the two canting angles a and b that can be different from other pairs of preselected canting angle a and preselected canting angle b. The spring 100 may deflect in at least two directions independently of one another.

An aspect of the present disclosure is understood to include a multi deflection canted coil spring 100 comprising a plurality of interconnected coils 102 having a coil centerline $\mathcal{C}_L$ and wherein each coil has a first preselected canting angle a with respect to the centerline and a second preselected canted angle b with respect to the centerline. Preselected angles a and b of the present canted coil spring 100 are different than the preselected angles a and b of the canted coil springs 100 of FIGS. 2A-2C and FIGS. 4A and 4C. The coils 102 can cant or deflect when a force is applied perpendicular to the centerline $\mathcal{C}_L$ to cant the spring 100 along preselected canting angle a and along preselected canting angle b to produce canting angles a' and b' and wherein the value of angle a' is smaller than the value of angle a and the value of angle b' is smaller than the value of angle b and the coils are further canted than before the deflection force is applied. The ends of the spring length 104 of the canted coil spring 100 can be connected to form a spring ring. In the present embodiment, the multi deflection canted coil spring 100 has a plurality of interconnected coils 102 that are initially canted to a first preselected canting angle a with respect to the centerline $\mathcal{C}_L$. The coils 102 are then each bent to establish a second preselected angle b with respect to the centerline $\mathcal{C}_L$. In other words, a first part 124 of each coil 102 stays fixed while a second part 126 of each coil is bent at the bent section 122 to form the second preselected angle b with respect to the centerline $\mathcal{C}_L$.

FIGS. 8A-8B show a spring length 104 of a multi deflection canted coil spring 100 comprising a plurality of coils 102, 102' provided in accordance with further aspects of the present disclosure. In an example, the spring length 104 comprises a plurality of coils 102, 102' that follow a sequence of alternating canting angles. FIG. 8A shows the multi deflection canted coil spring 100 wherein a first coil 102, viewing from left to right of FIG. 8A, has a first canting angle a with respect to the centerline $\mathcal{C}_L$ followed by a second coil 102' with a second canting angle b with respect to the centerline. The pattern then repeats between the coil 102 with the first canting angle a and the coil 102' with the second canting angle b and so forth. In other examples, the sequence of canting can repeat in a different pattern. FIG. 8B shows an end view of the spring length 104 with alternating sequence of coils 102, 102' of the multi deflection canted coil spring 100 of FIG. 8A in the direction of the centerline $\mathcal{C}_L$. The coils 102, 102' can have different shapes, different canting angles, or both.

Figure 8C:
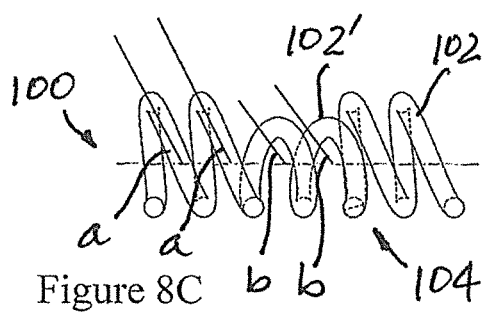
FIGS. 8C-8D show a multi deflection canted coil spring in a length wherein the coils follow a sequence of alternating canting angles.
Figure 8D:
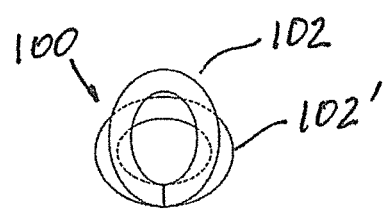
Figure 9A:
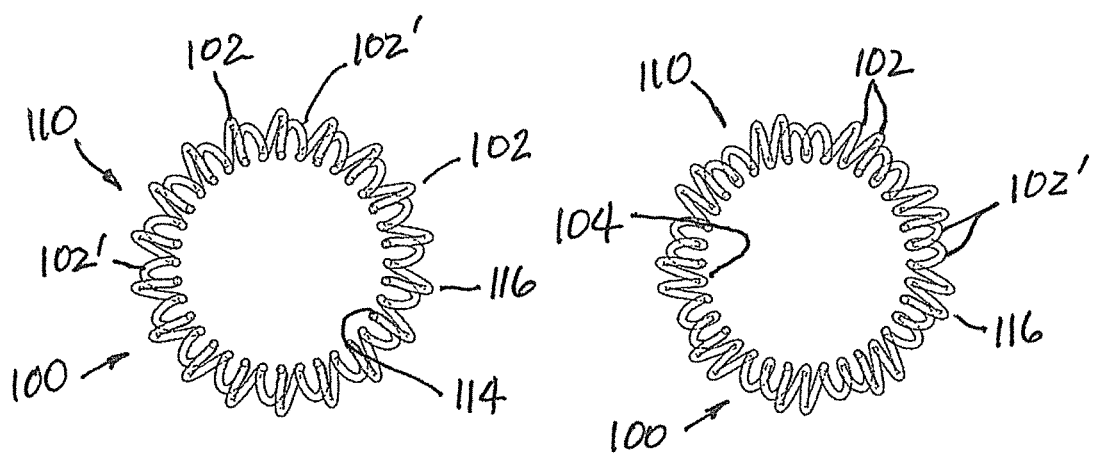
FIG. 9A shows a multi deflection canted coil spring in an annular shape by joining two ends of a spring length wherein the coils follow a sequence of alternating canting angles.
Figure 9B:
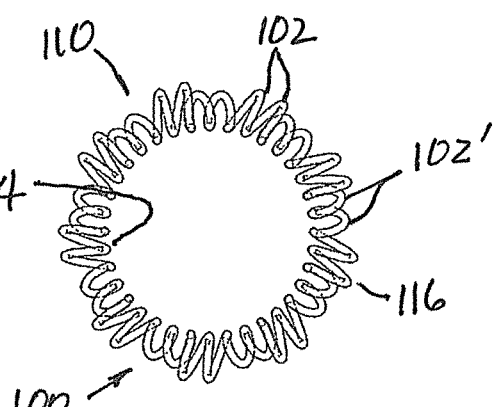
FIG. 9B shows a multi deflection canted coil spring in an annular shape by joining two ends of a spring length wherein the coils follow a sequence of alternating canting angles.

FIG. 8C shows a spring length 104 of a multi deflection canted coil spring 100 comprising a plurality of coils 102, 102' provided in accordance with further aspects of the present disclosure. In the present embodiment, the interconnected coils 102, 102' alternate between different canting angles but embody a different sequence than the sequence for the spring length 104 of FIGS. 8A and 8B. As shown, the first coil 102 and the second coil 102, viewing from left to right of FIG. 8C, have the same first canting angle a while the third coil 102' and the fourth coil 102' have a second canting angle b. FIG. 8D shows an end view of the spring length 104 with alternating sequence of canted coils 102, 102' with alternating sequence of canting in the direction of the centerline $\mathcal{C}_L$ of the multi deflection canted coil spring 100 of FIG. 8C. The spring length 104 comprises a first coil 102 and a second coil 102, viewing from left to right of FIG. 8A, having a first canting angle a with respect to the centerline $\mathcal{C}_L$ followed by a second coil 102' and a third coil 102' with a second canting angle b with respect to the centerline. The pattern then repeats. Such sequence of coils 102, 102' with alternating canting angles a, a, b, b, a, a, b, b, etc. allows deflection of coils in at least two directions and may also be formed into an annular shape to form spring rings 110 as shown in FIGS. 9A-9B, which may be used in connectors and sealing applications with annular shapes. As shown, the spring length 104 of FIGS. 8A and 8B may have its two ends joined to form the spring ring 110 of FIG. 9A. The spring length 104 of FIGS. 8C and 8D may have its two ends joined to form the spring ring 110 of FIG. 9B. The spring 100 may deflect in at least two directions independently of one another.

Figure 10A:
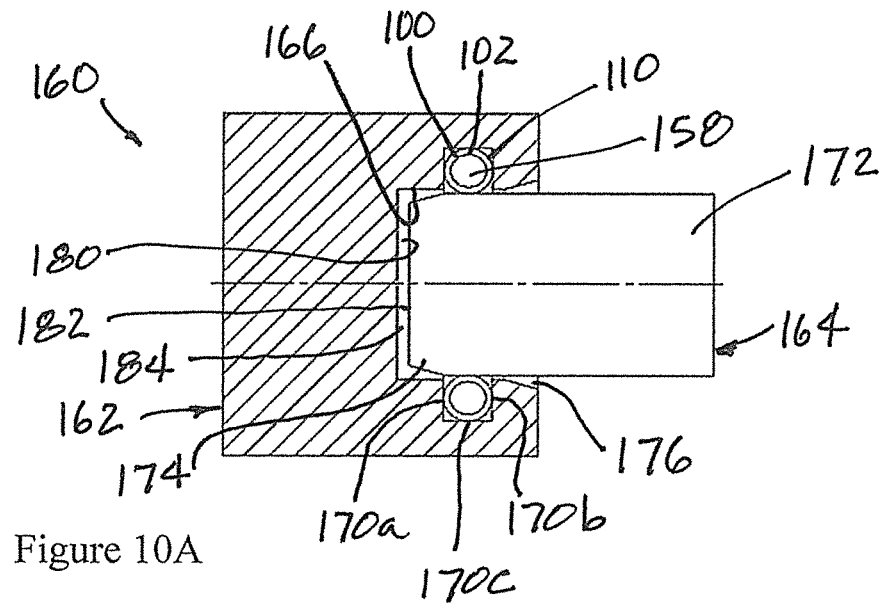
FIGS. 10A-10B show a connector with different multi deflection canted coil springs used therewith in an electromechanical connector application and the spring is housing mounted.

FIGS. 10A-10G show different connector applications using the multi deflection canted coil spring or MDCCS 100 of the present disclosure, which has a plurality of interconnected coils 102 with at least two different preselected canting angles a, b that can deflect when at least two different force vectors along at least two different planes are applied generally perpendicularly to the coil centerline $\mathcal{C}_L$. The MDCCS 100 may be any of the multi deflection canted coil springs 100 discussed elsewhere herein. The MDCCS 100 is used in a spring ring configuration 110. With reference initially to FIG. 10A, the multi deflection canted coil spring 100 is shown as an electrical contact in a housing mounted configuration in which the MDCCS 100 is located in a housing spring groove or spring cavity 158 of a housing 162 to provide current through an electrical connector assembly 160 comprising a pin or piston 164. The pin 164 may be referred to as a first body and is typically made from a metal material that conducts electricity. The housing 162 may be referred to as a second body and is typically made from a metal material with a bore 166 that accepts the pin 164. The terms first and second are used to designate two different objects only, similar to a first person and a second person, and are understood to not be structurally limiting unless the context indicates otherwise. The multi deflection canted coil spring 100 is positioned in the housing groove or spring cavity 158 to provide continuity of electrical path. A first electrical or electronic component may be connected to a second electrical or electronic component through or via the connector assembly 160. For example, the first electrical component, which may be a circuit board, can be connected to the second electrical component, such as another circuit board or a power source, through or via the connector assembly 160, which may be wired to the first and second electrical components.

The spring groove, housing groove, or spring cavity 158 shown comprises two sidewalls 170a, 170b and a bottom wall 170c located between the two sidewalls. The two sidewalls 170a, 170b are generally parallel to one another and the bottom wall 170c is generally perpendicular to at least one of the two sidewalls 170a, 170b when viewed in side cross section. In other examples, the two sidewalls 170a, 170b can be angled relative to one another, such as taper inwardly or outwardly. The spring groove 158 is sized and shaped so that when the piston is inserted into the bore 166 of the housing 162, the wall surfaces of the spring groove 158 loads the canted coil spring 100 and cants the spring along at least two directions perpendicular to the coil centerline. The MDCCS 100 cants when the interconnected coils 102 or 102/102' go from an initial canting position in which the interconnected coils are canted along preselected canting angles a and b and the loading caused by the wall surfaces of the spring groove 158 and the pin 164 deflect the interconnected coils so that the coils now cant at angles a' and b', which are smaller in values than angles a and b, respectively. In contrast, prior art canted coil springs in which the coils are canted along a single canting angle can only cant along a single direction perpendicular to the coil centerline when loaded, for example going from angle a to angle a' only but cannot cant in any other direction. Consequently, the spring groove 158 of the disclosed housing 162 can be sized and shaped to be more compact than comparable applications that use a single canting direction canted coil springs due to the ability of the present multi deflection canted coil spring 100 being able to cant in at least one additional direction perpendicular to the coil centerline ℄.

The multi deflection canted coil spring 100 of the present embodiment, when used with the spring groove 158 and loaded against the surface 172 of the pin 164 can also generate different opposing spring forces against the wall surfaces of the housing groove 158 and the pin 164 that is not possible with prior art canted coil springs with only a single canting direction. For example, because the present multi deflection canted coil spring 100 can cant in at least two different directions perpendicular to the coil centerline, the multi deflection canted coil spring of the present disclosure can produce a biasing force in at least one additional direction over traditional canted coil spring. This additional canting direction allows a connector designer to introduce different geometries to the spring groove or to generate a spring force to surfaces of the connector that is not previously possible. Thus as shown, the plurality of coils 102 are understood to be deflected by the two sidewalls 170a, 170b of the spring groove 158 to cant the coils further from the first preselected canting angle a to a canted angle a' and by the bottom wall 170c and the surface 172 of the pin 164 to cant the coils further from the second preselected canting angle b to a canted angle b'. The deflection of the plurality of coils 102 along the two different directions may also be caused by or due to a combination of other factors, such as due to the constraint of the surface 172 of the pin and one or both sidewalls 170a, 170b.

The pin 164 is shown with a tapered insertion end 174 and the bore 166 is provided with a tapered or flared opening 176, which is larger in circumference than the inside diameter of the bore, away from the spring groove. The flared opening 176 allows the pin 164 to more easily insert into the bore 166 and the tapered insertion end 174 allows the pin to more readily lift the spring 100 to complete the connection. By lifting the spring in the present context, it is understood to mean canting the spring, such as canting the plurality of coils 102 of the canted coil spring 100, from the inside diameter of the spring ring 110 while supporting the outside diameter of the spring ring. The surface 172 of the pin 164, which has a larger outside diameter than the inside diameter of the spring ring 110, causes the plurality of coils 102 to cant in at least two directions perpendicular to the coil centerline to cant the coils from a first preselected canting angle a to a canted angle a' and from a second preselected canting angle b to a canted angle b'.

The bore 166 may have an end wall 180 or the bore may be a through bore without an end wall. The pin 164 is shown with an insertion end surface 182 and is solid in construction. In other examples, the pin may be hollow and has a lumen. A gap 184 is provided between the two end surfaces 180, 182 when the pin 164 is inserted into the bore 166 of the housing 162. In some examples, a non-conducting or dielectric spacer may be placed inside the bore or at the end surface of the pin to ensure the gap.

The constrain on the multi deflection canted coil spring 100 as described may help to withstand greater amount of mechanical shock while maintaining groove retention, experience an increase in insertion and breakout force, and have better conductance reliability due to increased contact points and elimination of axial play. Also due to such capability, the spring grooves 158 may not need to have narrow tolerances to manufacture, which may consequently ease the manufacturing process and decrease the overall costs.

Figure 10B:
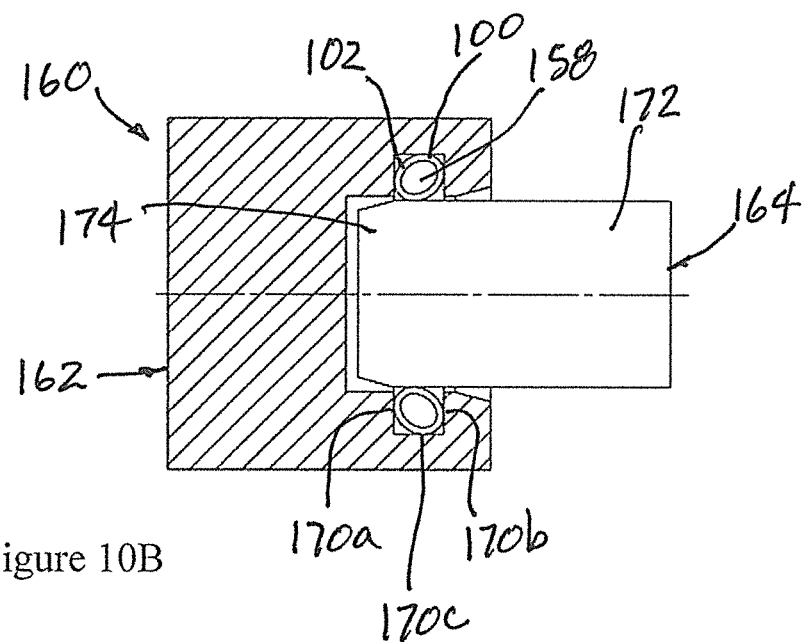

FIG. 10B shows a similar connector assembly 160 as that of FIG. 10A with an alternative multi deflection canted coil spring 100. Thus, the canted coil spring 100 shown in FIG. 10B is understood to comprise a plurality of interconnected coils 102 with at least two different preselected canting angles that can deflect when at least two different force vectors are applied generally perpendicularly to the coil centerline ℄. The different force vectors are understood to differ in directions, with the same or different values. As shown, the plurality of coils 102 are each rotated about the coil centerline compared to the angular position of the coils 102 of FIG. 10A relative to the coil centerline. The plurality of coils 102 are understood to be deflected by the two sidewalls 170a, 170b of the spring groove 158 to cant the coils further from the first preselected canting angle a to a canted angle a' and by the bottom wall 170c and the surface 172 of the pin 164 to cant the coils further from the second preselected canting angle b to a canted angle b'. The deflection of the plurality of coils 102 along the two different directions may also be caused by or due to a combination of other factors, such as due to the constraint of the surface 172 of the pin and one or both sidewalls 170a, 170b.

Figure 10C:
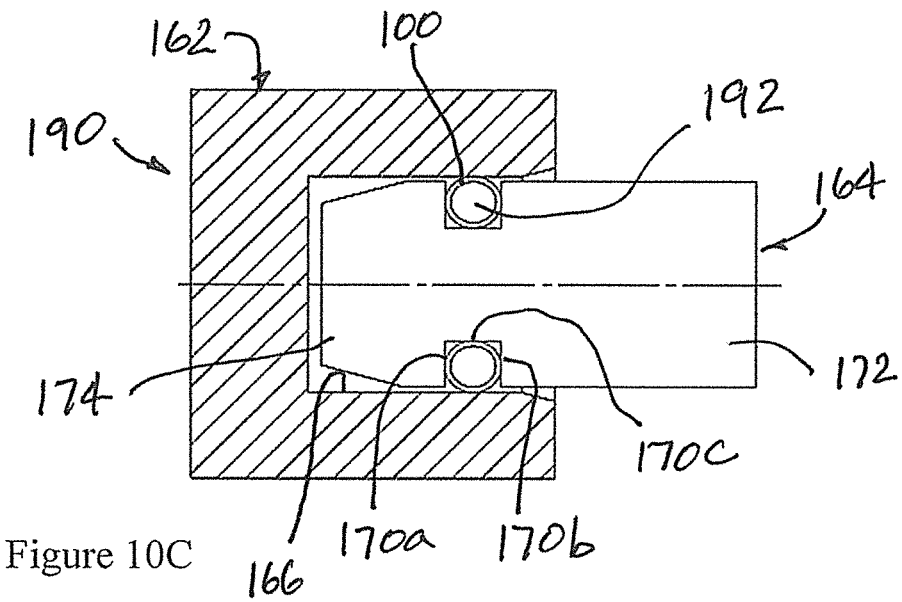
FIGS. 10C-10D show a connector with different multi deflection canted coil springs used therewith in an electromechanical connector application and the spring is piston mounted.

FIG. 10C shows a connector assembly 190 comprising a housing 162 and a piston or pin 164. The present connector assembly 190 is similar to the connector assembly 160 of FIG. 10A except the multi deflection canted coil spring 100 of the present disclosure is in a piston mounted configuration. That is, a piston groove or pin groove 192 is provided with the piston 164 for retaining the MDCCS 100 prior to assembling the piston and the housing together. The piston groove 192 may have similar structural features as discussed above for the housing spring groove 158.

Figure 10D:
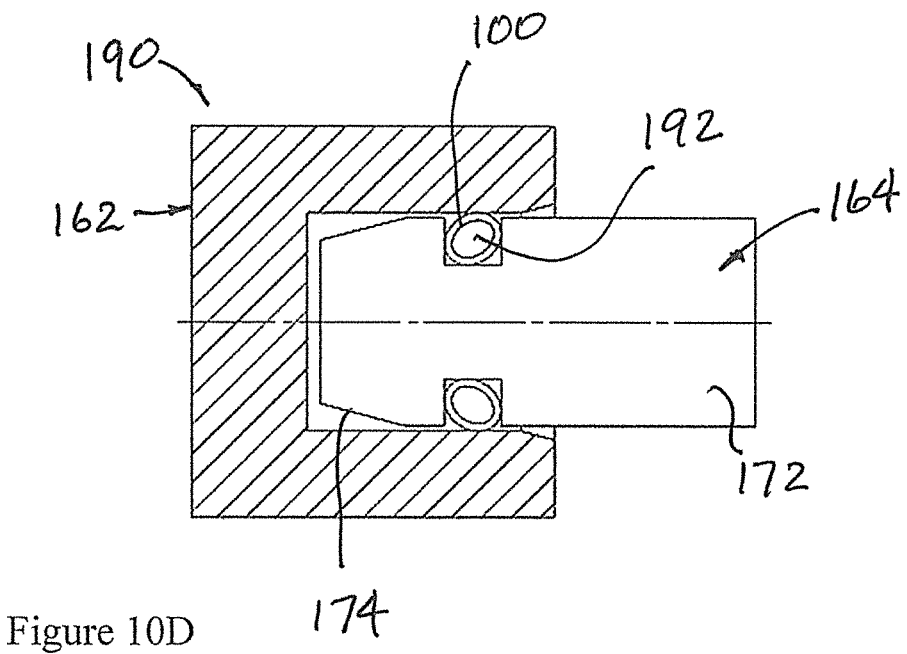

FIG. 10D shows a connector assembly 190 comprising a housing 162 and a piston or pin 164, similar to the connector assembly of FIG. 10C, and has a piston mounted multi deflection canted coil spring 100. However, the MDCCS 100 of the present embodiment is similar to the MDCCS 100 of FIG. 10B, which has coils that are rotated relative to the coil centerline.

Figure 10E:
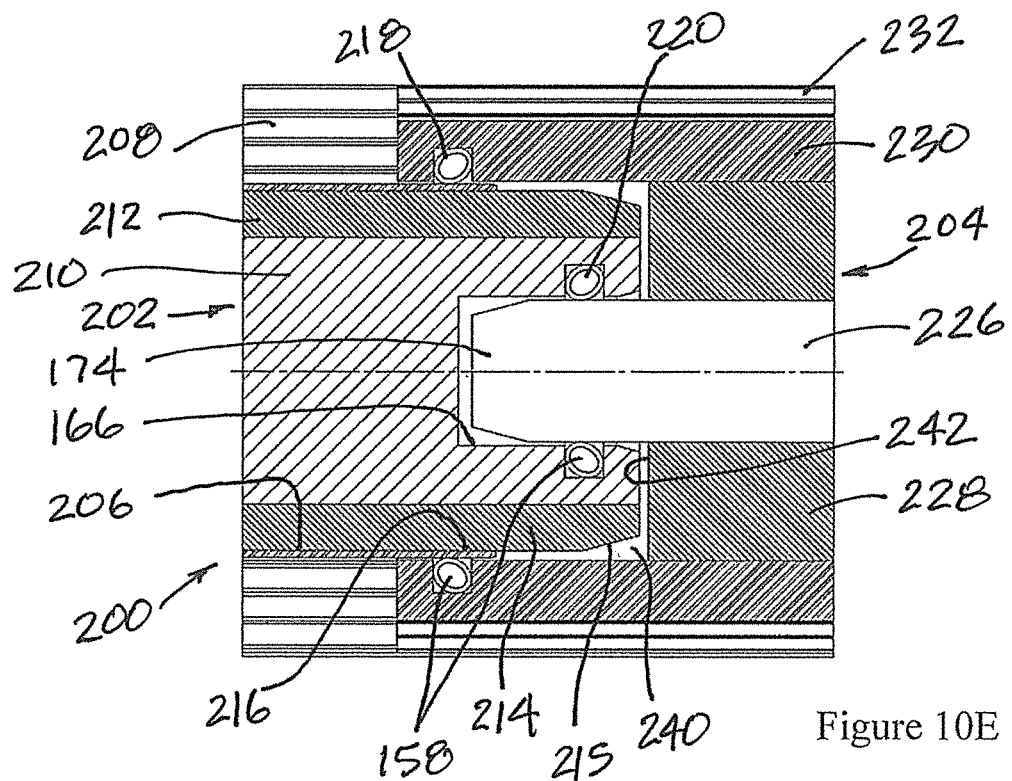
FIGS. 10E-10F show two multi deflection canted coil springs in an electro-mechanical connector application and the springs are housing mounted.

FIG. 10E is a side cross-sectional schematic view of a coaxial connector assembly 200 provided in accordance with further aspects of the present invention, which comprises devices, systems, and methods. As shown, the coaxial connector assembly 200 comprises a first connector body 202 connected to a second connector body 204. The first connector body 202 comprises a first metal shield 206 covered by a first outer housing 208. The first connector body 202 further comprises metal core 210 that is separated from the first metal shield 206 by an internal jacket 212. The first outer housing 208 and the internal jacket 212 are dielectric or non-conducting to isolate the first metal shield 206 from the metal core 210 and from the outside environment. As shown, part of the outer housing 208 is peeled back or removed so as to expose an end section 216 of the first metal shield 206 to a first or outer multi deflection canted coil spring 218. The removed section of the first outer housing 208 also exposes a nose section 214 with a tapered insertion end 215 of the first connector body 202 for insertion into the bore of the second connector body 204, as further discussed below. The metal core 210 has a bore 166 and a spring groove 158 with an inner or second multi deflection canted coil spring 220 located therein. The first MDCCS 218 and the second MDCCS 220 can be any of the multi deflection canted coil springs discussed elsewhere herein. The bore 166 and the spring groove 158 of the first connector body 202 can be similar to the bore 166 and housing groove 158 of the connector assembly 160 of FIG. 10A.

The second connector body 204 comprises a metal pin 226, an internal jacket 228 surrounding the pin, a second metal shield 230, and a second outer housing 232. The second outer housing 232 and the internal jacket 228 are dielectric or non-conducting to isolate the first pin 226 from the second metal shield 230 and from the outside environment. The second connector body 204 has a bore 240 for receiving the nose section 214 of the first connector body 202. The bore 240 has a bore diameter and an end wall 242 having the metal pin 226 projecting outwardly thereof for insertion into the bore 166 of the first connector body 202.

When the first connector body 202 is connected to the second connector body 204 as shown in FIG. 10E, the first MDCCS 218 provides electrical communication between the first metal shield 206 and the second metal shield 230, and the second MDCCS 220 provides electrical communication between the pin 226 and the metal core 210. The first multi deflection canted coil spring 218 is used as a second connector body mounted electromagnetic interference shielding and grounding that provides continuity in electrical path between the first metal shield 206 and the second metal shield 230. To elaborate, the second metal shield 230 of the second connector body 204 has a sufficient thickness to incorporate a spring groove 158, which can be similar to the spring groove 158 of FIG. 10A.

Figure 10F:
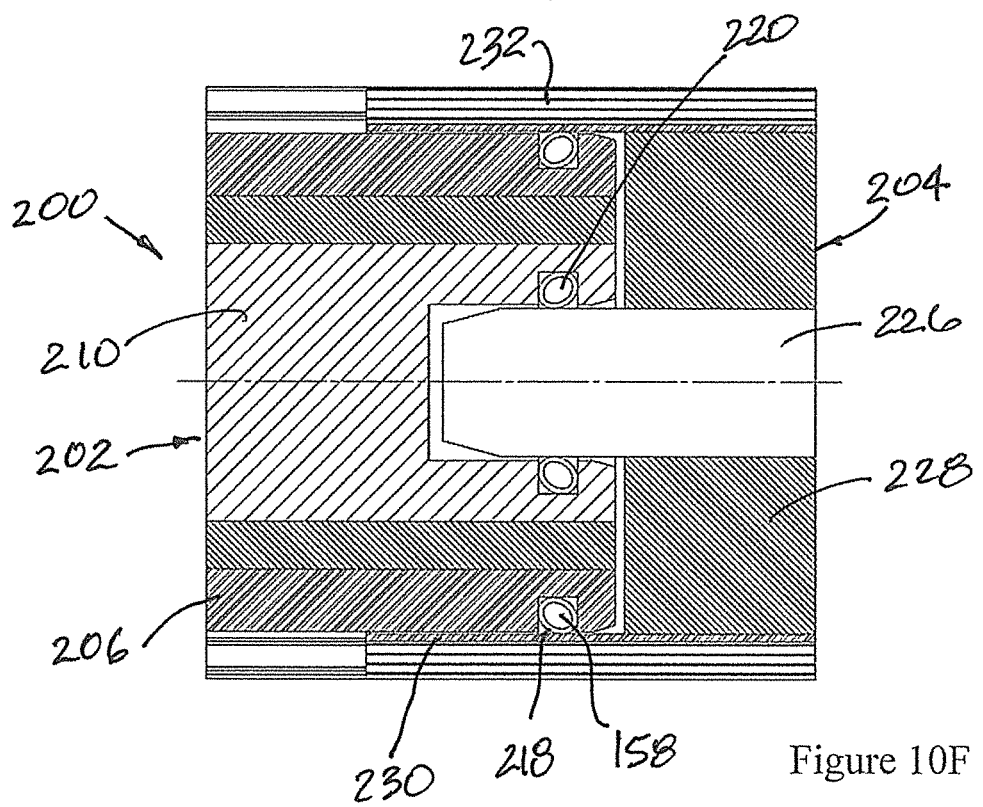

FIG. 10F shows a coaxial connector assembly 200 that is similar to the assembly of FIG. 10E with a few exceptions. In the present embodiment of FIG. 1 OF, the first metal shield 206 of the first connector body 202 is sufficiently thick to incorporate a spring groove 158 for receiving the first or outer MDCCS 218. Because the second metal shield 230 of the second connector body 204 no longer has a spring groove for accommodating the first MDCCS 218, it is relatively thinner than the second metal shield 230 of FIG. 10E. In other examples, the various dimensions and thicknesses can vary. Thus, between the connector assembly 200 of FIG. 10E and FIG. 10F, the first MDCCS 218 can be mounted to the first connector body 202 or the second connector body 204 prior to assembling the first connector body to the second connector body. Similarly, the pin 226 can be modified to incorporate a spring groove to accommodate the second MDCCS 220 instead of putting the second MDCCS in the spring groove of the bore.

Figure 10G:
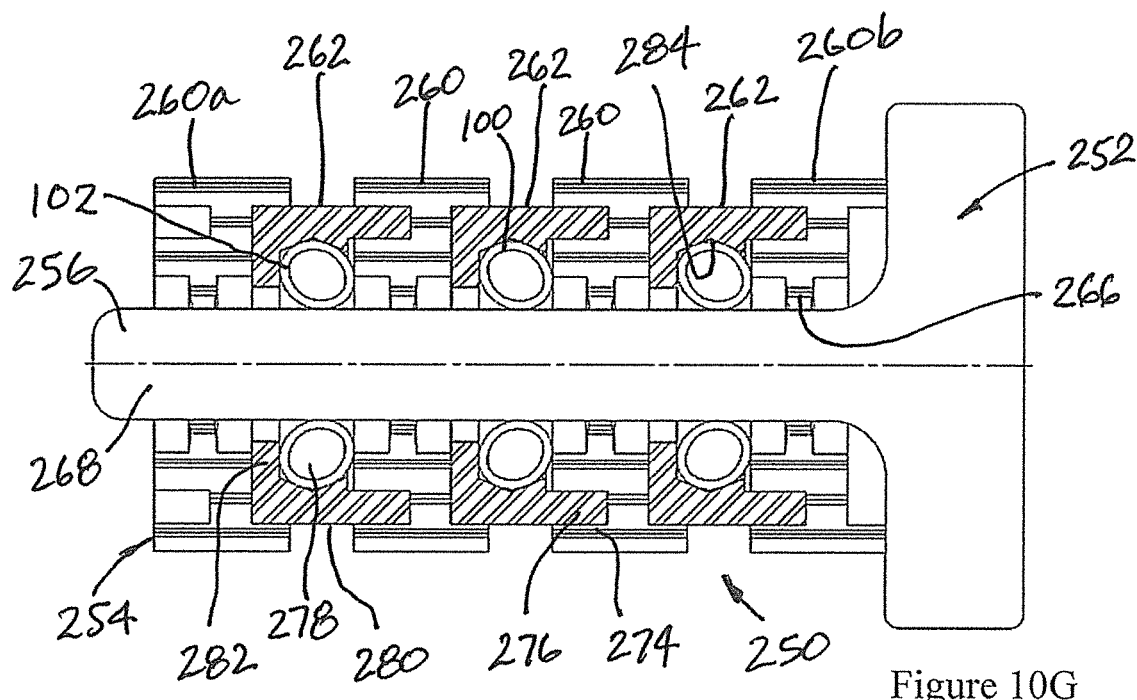
FIG. 10G shows a stackable connector assembly with a plurality of multi deflection canted coil springs.

FIG. 10G shows a stackable connector assembly 250 comprising a first body 252 and assembled to a second body 254. The first body 252 is shown schematically and can represent a pin for conducting current or electricity. In some examples, the first body 252 can be a conductive cable comprising a plurality of leads for contacting the plurality of MDCCS 100 shown, similar to conductive cables used with implantable medical devices, IMDs. The plurality of leads can be spaced from one another by a dielectric sleeve or section. Internally of the elongated body 256 of the first body 252, plurality of cables are coupled to a respective lead on the elongated body. The plurality of cables inside the elongated body 256 can extend to or be connected to other devices or terminals, such as to electrodes for placement on a heart to function as an implantable cardioverter defibrillator.

The second body 254 is shown with a plurality of insulating elements 260, which can be dielectric or non-conducting, stacked in between a plurality of conductive ring contact elements 262. A canted coil spring 100 is provided with each conductive ring contact element 262. The number of alternating insulating elements and conductive ring contact elements can vary depending on the nodes required for the IMD. Thus, fewer than three conductive ring contact elements or more than three conductive ring contact elements with corresponding insulating elements and canted coil springs are contemplated.

The two end insulating elements 260a, 260b may be the same as or similar to the intermediate insulating elements 260 in that they isolate the conductive ring contact elements 262 from other conductive components but can incorporate other features for securing or attaching the stacked connector assembly 250 to other components, such as to a header of an IMD. As shown, each insulating element comprises an annular projection 266 extending from the interior bore thereof for sealing against the exterior surface 268 of the elongated body 256. In some examples, the wall surface of the bore can be recessed at the base of each annular projection 266 to increase the effective length of the annular projection measured from the base to the tip of the annular projection. This increases the length to width ratio of the annular projection and its ability to deflect when the first body 252 is inserted into the common bore of the second body 254.

Each insulating element 260 comprises a groove 274 for receiving an axial projection 276 of an adjacent conductive ring contact element 262. A spring groove 278 is provided with each conductive ring contact element 262 for holding a multi deflection canted coil spring 100, which can be any of the various MDCCS discussed elsewhere herein. The spring groove 278 can have two sidewalls formed by two adjacent insulating elements 260, formed by two conductive sidewalls extending from a central wall 280, or formed by one conductive sidewall 282 extending from the central wall 280 and one non-conductive sidewall formed by an adjacent insulating element 26, the latter as shown in FIG. 10G. Interiorly of the central wall 280 of each conductive ring contact element 262, a bottom wall 284 having two tapered surfaces is provided to simultaneously contact the MDCCS 100 located therein. The MDCCS 100 is biased against both the bottom wall 284 and the surface 268 of the first body 252. The MDCCS 100 can also bias against both sidewalls as shown.

The deflection of coils 102 of the multi deflection caned coil spring 100 in at least two directions may bring an optimized connector system in terms of shape and size by decreasing the groove width and constraining the multi deflection canted coil spring 100. The constraining of the multi deflection canted coil spring 100 may help to withstand greater amount of mechanical shock while maintaining groove retention, experience an increase in insertion and breakout force, and have better conductance reliability due to increased contact points and elimination of axial play. Also due to such capability, the spring grooves 278 may not need to have narrow tolerances to manufacture, which may consequently ease the manufacturing process and decrease the overall costs.

Figure 11A:
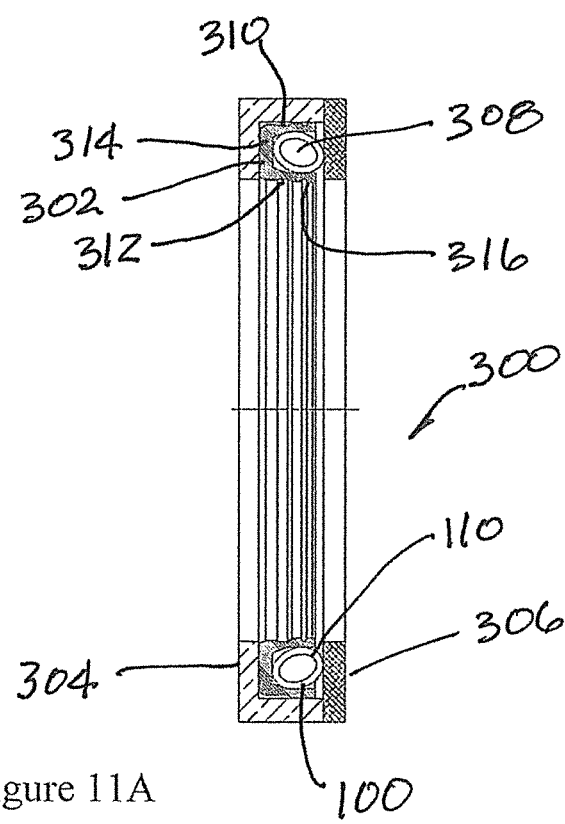
FIGS. 11A-11C show a multi deflection canted coil spring in different seal applications.
Figure 11B:
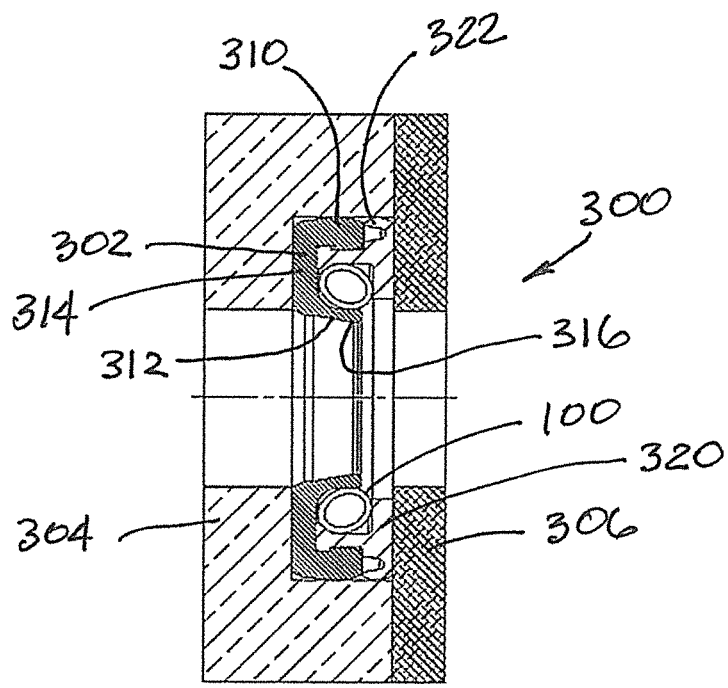
Figure 11C:
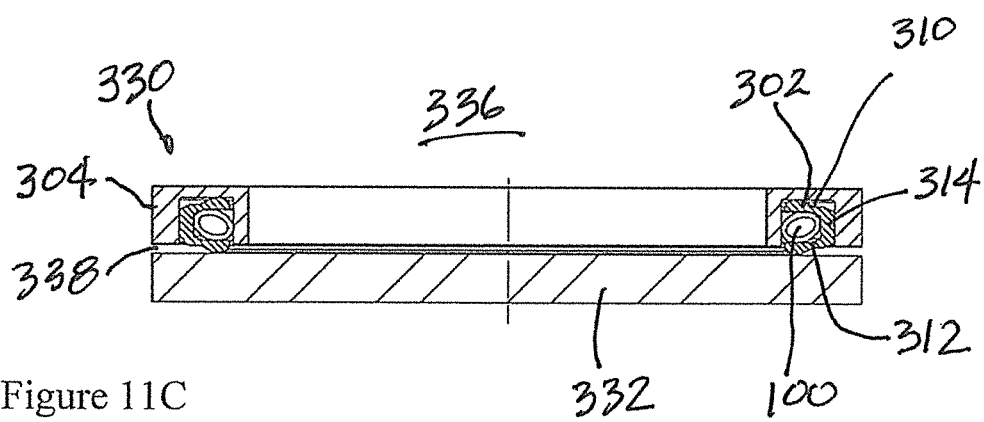

FIGS. 11A-11C show different sealing applications in which multi deflection canted coil springs 100 of the present disclosure are used. The canted coil spring 100 has a plurality of interconnected coils 102 with at least two different preselected canting angles that can deflect when at least two different force vectors are applied generally perpendicularly to the coil centerline ℄. FIG. 11A shows a multi deflection canted coil spring 100, in a spring ring 110 configuration, used as a spring energizer in a seal assembly 300 comprising a sealing component 302, a housing 304, and a plate 306. Such seal assembly 300 is generally used as a rotary or a static shaft seal in which the spring energizer 100 is typically a canted coil spring. The canted coil spring 100 is located in a spring groove 308, which is defined by an outside flange 310, an inside flange 312 having a sealing lip 316, and a center channel section 314 located between the outside flange and the inside flange.

A problem may arise when a typical spring energized seal assembly undergoes extreme environmental conditions, such as high temperature, whereby the sealing component may shrink, and consequently, have the sealing component be loosely fitted between the housing and the plate. Furthermore, a typical prior art canted coil spring cannot be constrained and retained within the spring cavity of the sealing component, shuttling or axial play may then occur more readily. For example, if the sealing component shrinks, it no longer occupies the same space inside the housing and can float, such as experience shuttling or axial play. However, the multi deflection canted coil spring 100 of the present embodiment is able to deflect in at least two directions and therefore can be constrained and retained within the spring cavity or spring groove 308 of the sealing component 302 even if the sealing component 302 may shrink. For example, the multi deflection canted coil spring 100 can bias against the plate 306 and the center channel section 314 and be constrained within the holding space inside the housing 302. Thus, by positioning the multi deflection canted coil spring 100 of the present disclosure inside a sealing component 302 with an inside flange, an outside flange, and a center channel section, the assembly 300 can experience reduce shuttling and the MDCCS 100 can provide a more consistent spring force onto the sealing component 302. Also, the manufacturability of the sealing component 302 can be simplified when used with a multi deflection canted coil spring 100 since it no longer needs an extended inside flange 312 typically used to prevent a conventional canted coil spring from contacting the plate 306. As shown, the MDCCS 100 contacts both inside and outside flanges 310, 312, and can also contact the center channel section 314 and the plate 306. As is also shown in FIG. 11A, the sealing lip on the inside flange 312 is shortened to retain the multi deflection canted coil spring 100 within the spring cavity 308, consequently retaining the sealing component 302 within the housing 304, whereby such simplified structure may ease manufacturability and decrease the overall cost.

FIG. 11B shows a seal assembly 300 that is similar to the seal assembly of FIG. 11A but further includes a retaining member or retaining ring 320, which can be a locking ring with a cantilevered spring finger 322 for biasing against the bore of the housing 304 to retain the seal element 302 within the holding space of the housing 304. Similar to the advantages mentioned for the seal assembly of FIG. 11A, the retaining member 320 can be used to constrain and retain the multi deflection canted coil spring 100, which is used in a spring ring configuration. For example, rather than contacting the plate 306, the multi deflection canted coil spring 100 can contact the retaining member 320. Such retention may reduce shuttling and provide a more consistent spring force onto the sealing component 302.

FIG. 11C shows a face seal assembly 330 comprising a sealing component 302, a housing 304, a spring energizer 100, and a face plate 332 wherein the spring energizer is a multi deflection canted coil spring as described elsewhere herein. The face seal assembly 330 is configured to prevent leakage from within an interior space 336 through a seam or gap 338 with the face plate 332. The sealing component 302 has an inside flange, an outside flange, and a center channel section located between the two flanges, similar to that of FIG. 11A. The multi deflection canted coil spring 100 of FIG. 11C is constrained and retained within the sealing component 302 by the housing 304. Similar to the advantages mentioned for FIG. 11A and FIG. 11B, such capability by the multi deflection canted coil spring 100 to be retained within the sealing component 302 reduces shuttling due to possible shrinkage of the sealing component when exposed to extreme environmental conditions.

FIG. 12A is an end view a coil 102 of a multi deflection canted coil spring 100 in either a spring length or a spring ring. The coil 102 is one of a plurality of coils that are interconnected with one another in a spaced apart relationship. Each coil of the plurality of coils 102 has a generally square configuration having four sides 350, 352, 354, 356 and four rounded corners. The coils can instead have a generally rectangular configuration or more broadly a polygonal configuration. Like other multi deflection canted coil springs discussed elsewhere herein, each coil 102 is canted in at least two directions with each direction at a preselected canting angle so that the coil can be caused to cant or deflect along two different directions when two different force vectors are applied. As an example, each of the coils 102 can deflect along a first direction at a preselected canting angle a by tilting the upper side 352 of the coil into the page of FIG. 12A. Each of the coils 102 can also deflect along a second direction at a preselected canting angle b by tilting the right side 354 of the coil into the page of FIG. 12A. Thus, the presently disclosed multi deflection canted coil spring 100 can be caused to deflect when subjecting the coils 102 to deflecting force vectors acting generally perpendicularly through the centerline ℄ acting through sides 352/356 and generally perpendicularly through the centerline ℄ acting through sides 350/354. Viewed another way, if the spring 100 of FIG. 12A is placed into a spring groove and lifted by a surface and wherein the space defined by the spring groove and the surface is square along a cross section but generally smaller than the dimension of the coil 102, the coil will deflect by canting at side 352 into the page of FIG. 12A and at side 354 into the page of FIG. 12A. The coils are also deflectable in at least two directions independently of one another.

FIG. 12B is an end view of two different coils 102 of a multi deflection canted coil spring 100 in either a spring length or a spring ring. The coils 102 are part of a plurality of coils that are interconnected with one another in a spaced apart relationship. Each coil of the plurality of coils 102 has a generally rectangular configuration having four sides 350, 352, 354, 356 and four rounded corners. However, when viewing two adjacent coils 102, the spring appears to have a "T" shape configuration. Further, because of the "T" shape configuration formed by two adjacent coils, the present spring has two coil centerlines defined by the horizontally positioned coils and by the vertically positioned coils. In the present embodiment, two adjacent coils 102 are rotated relative to one another. For example, after a first coil 370 is formed with four sides 350, 352, 354, 356, the next coil 372 is formed also with four sides 350, 352, 354, 356 but with a different orientation so that so that the first coil 370 has a long side 354 positioned horizontally and the next coil 372 has a long side 350 positioned vertically. Thus, the present canted coil spring 100 is understood to include at least two adjacent coils that are both rectangular shape and wherein one coil with the rectangular shape is rotated 90 degrees relative to the other coil with the rectangular shape.

Like other multi deflection canted coil springs discussed elsewhere herein, each coil 102 of the spring of FIG. 12B is canted but the multi deflection characteristic of the spring 100 is attributable to sequencing the coils in a repeating pattern, similar to the spring of FIGS. 8A-8D. As an example, the first coil 370 can deflect along a first direction at a preselected canting angle a by tilting the short side 352 of the coil into the page of FIG. 12B. The second coil 372 of the plurality of coils can also deflect along a second direction at a preselected canting angle b by upper short side 352 of the coil into the page of FIG. 12B. Thus, the presently disclosed multi deflection canted coil spring 100 can be caused to deflect when subjecting the coils 102 to deflecting force vectors acting generally perpendicularly through the centerline $C_L$ acting through sides 352/356 of the horizontally positioned coils and generally perpendicularly through the centerline $C_L$ acting through sides 352/356 of the vertically positioned coils. Viewed another way, if the spring 100 of FIG. 12B is placed into a spring groove and lifted by a surface and wherein the space defined by the spring groove and the surface is square along a cross section but generally smaller than the overall profile dimension of the coils 370/372, the coils will deflect by canting at sides 352 into the page of FIG. 12B. The same coils can repeat in pattern between the first coil 370 and the second coil 372 to form a spring 100 or the pattern can have a different sequence, such as (1) coils 370, 370, 372, 370, 370, 372, etc. or (2) coils 370, 370, 372, 372, 370, 370, etc. Thus, the spring 100 of FIG. 12B can deflect in at least two directions with each direction at a preselected canting angle so that the coil can be caused to cant or deflect along two different directions when two different force vectors are applied. The coils are also deflectable in at least two directions independently of one another.

FIG. 12D is an end view of a coil 102 of a multi deflection canted coil spring 100, in either a spring length or a spring ring, having two long sides 350, 354 and two short sides 352, 356. The present coil 102 is similar to the coil 102 of FIG. 12B except the two short sides 352, 356 are curved, which resembles a typical medicine pill. In one example, the coils 102 of the present canted coil spring 100 of FIG. 12D are each canted along a first preselected angle a by tilting the long side 350 into the page of FIG. 12D. The plurality of interconnected coils 102 are also each canted along a second preselected angle b by tilting the right short side 352 into the page of FIG. 12D. Thus, the present canted coil spring 100 is a multi deflection canted coil spring, similar to other multi deflection canted coil springs discussed elsewhere herein. In an alternative embodiment, the coils 102 of FIG. 12B may embody the pill shape configuration of the coils of FIG. 12D, which have curved or arcuate short sides 352, 356.

FIG. 12C is an end view a coil 102 of a multi deflection canted coil spring 100 in either a spring length or a spring ring. The coil 102 is one of a plurality of coils that are interconnected with one another in a spaced apart relationship. Each coil of the plurality of coils 102 has a generally rectangular configuration having three sides 380, 382, 384 and three rounded corners 386, 388, 390 and a coil centerline $C_L$. Like other multi deflection canted coil springs discussed elsewhere herein, each coil 102 is canted in at least two directions with each direction at a preselected canting angle so that the coil can be caused to cant or deflect along two different directions when two different force vectors are applied. As an example, each of the coils 102 can deflect along a first direction at a preselected canting angle a by tilting the lower right corner 388 of the coil into the page of FIG. 12C. Each of the coils 102 can also deflect along a second direction at a preselected canting angle b by tilting the upper corner 386 of the coil into the page of FIG. 12C. Thus, the presently disclosed multi deflection canted coil spring 100 can be caused to deflect when subjecting the coils 102 to deflecting force vectors acting generally perpendicularly through the centerline $C_L$ acting through corner 386 and side 384 and generally perpendicularly through the centerline $C_L$ acting through corner 388 and side 380. Viewed another way, if the spring 100 of FIG. 12A is placed into a spring groove and lifted by a surface and wherein the space defined by the spring groove and the surface is smaller than the dimension of the coil 102, the coil will deflect by canting along multiple separate directions.

Figure 13:
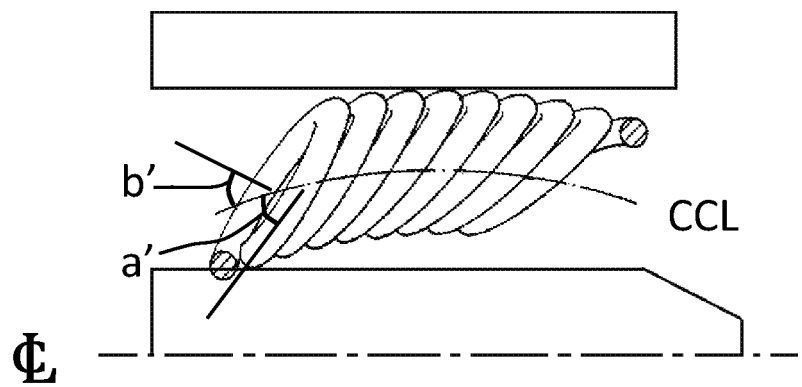
FIG. 13 is a partial cut-away perspective view of a connector having a housing and a pin with a canted coil spring located therebetween and wherein the plurality of coils are canted to angle a' along a first plane and canted to angle b' along a second plane.
Figure 14:
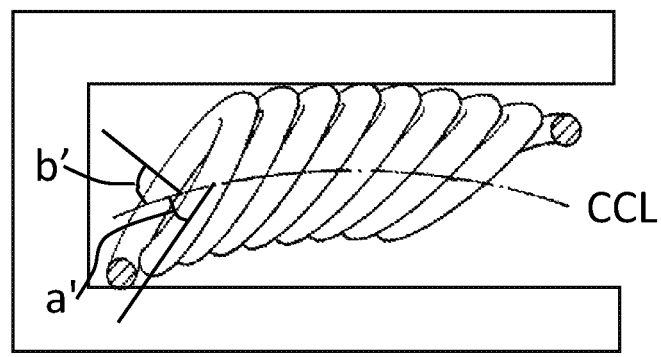
FIG. 14 is a partial cut-away perspective view of a seal assembly having a seal element with a canted coil spring located therein and wherein the plurality of coils are canted to angle a' along a first plane and canted to angle b' along a second plane.

FIG. 13 is a partial cut-away perspective view of a connector having a housing and a pin with a canted coil spring located therebetween and wherein the plurality of coils are canted to angle a' along a first plane and canted to angle b' along a second plane, viewed relative to the coil centerline (CCL). FIG. 14 is a partial cut-away perspective view of a seal assembly having a seal element with a canted coil spring located therein and wherein the plurality of coils are canted to angle a' along a first plane and canted to angle b' along a second plane, viewed relative to the coil centerline (CCL).

Methods of making and of using the multi deflection canted coil springs, connector assemblies, seal assemblies, and their components described elsewhere herein are understood to be within the scope of the present disclosure.

Although limited embodiments of multi deflection canted coil springs, connector assemblies, seal assemblies, and their components have been specifically described and illustrated herein, many modifications and variations will be apparent to those skilled in the art. For example, the various canted coil springs and connector assemblies may incorporate different metal claddings or different platings, may be used in different end applications, etc. For example, the connectors described with reference to FIGS. 10A and 10E may be used in any number of industries, including in aerospace, automotive, military defense, consumer electronics, oil and gas, etc. Furthermore, it is understood and contemplated that features specifically discussed for a canted coil spring, a connector assembly embodiment, or a seal assembly may be adopted for inclusion with another canted coil spring, another connector assembly embodiment or another seal assembly, provided the functions are compatible. For example, while one connector is described with certain groove geometry and a certain spring ring, different groove geometries and different spring rings with different coil alternating patterns may be used that are described elsewhere herein. Accordingly, it is to be understood that the canted coil springs, connector assemblies, seal assemblies, and their components constructed according to principles of the disclosed device, system, and method may be embodied other than as specifically described herein. Still furthermore, where one feature of an embodiment is shown but not expressly described but the same or similar feature is shown and described in another embodiment, the disclosed part may be understood to describe or teach the same or similar feature in the other disclosed but not expressly described embodiment. The disclosure is therefore understood to teach a person of ordinary skill in the art the disclosed embodiments without having to repeat similar components in all embodiments. The disclosure is also defined in the following claims.

What is claimed is:

1. A connector assembly comprising a first body and a second body wherein the second body is inserted into the first body;
   the first body or the second body having a spring groove comprising two or more walls and a canted coil spring located within the spring groove; and
   the canted coil spring comprising a plurality of coils interconnected with one another in a spaced-apart relationship and having a coil centerline passing through the plurality of coils; each coil comprising a plurality of coil sections that are canted at a first preselected angle a with respect to the coil centerline and with respect to a first canting plane that is parallel to the coil centerline and the plurality of coil sections of each of said plurality of coils being canted at a second preselected angle b with respect to the coil centerline and with respect to a second canting plane that is parallel to the coil centerline, said second canting plane being rotated relative to the first canting plane;
   wherein each coil of said plurality of coils is deflectable from said first preselected angle a to a further canted angle a' in a first direction with respect to the first canting plane and from said second preselected angle b to a further canted angle b' in a second direction with respect to the second canting plane, the first direction and the second direction being generally perpendicular to said coil centerline;
   wherein the first direction and the second direction are angled to one another; and
   wherein angle a and angle a' represent angle values with respect to the first canting plane and angle b, and angle b' represent angle values with respect to the second canting plane.

2. The connector assembly according to claim 1, wherein the canted coil spring is constrained within the spring groove.

3. The connector assembly according to claim 1, wherein the two or more walls of the spring groove comprise two sidewalls and a bottom wall located therebetween.

4. The connector assembly according to claim 1, wherein at least five coils of the plurality of coils each has a bent section to form the second preselected angle b with respect to the coil centerline.

5. The connector assembly according to claim 1, wherein the spring groove is located with the first body and wherein the second body comprises a groove.

6. The connector assembly according to claim 5, wherein the canted coil spring is located in both the spring groove and the groove.

7. A seal assembly comprising a sealing component and a spring energizer;
   wherein the sealing component comprises an outside flange, an inside flange defining an annular opening and comprising a sealing lip, and a center channel section located between the inside flange and the outside flange and together define a spring cavity;
   wherein the spring energizer comprises a canted coil spring, said canted coil spring being positioned in the spring cavity to energize the inside flange and the outside flange away from one another;
   wherein the canted coil spring comprises a plurality of coils interconnected with one another in a spaced-apart relationship and having a coil centerline passing through the plurality of coils; each coil comprising a plurality of coil sections that are canted at a first preselected angle a with respect to the coil centerline and with respect to a first canting plane that is parallel to the coil centerline and the plurality of coil sections of each of said plurality of coils being canted at a second preselected angle b with respect to the coil centerline and with respect to a second canting plane that is parallel to the coil centerline, said second canting plane being rotated relative to the first canting plane;
   wherein each coil of said plurality of coils is deflectable from said first preselected angle a to a further canted angle a' in a first direction with respect to the first canting plane and from said second preselected angle b to a further canted angle b' in a second direction with respect to the second canting plane, the first direction and the second direction being generally perpendicular to said coil centerline;
   wherein the plurality of coils are deflectable in the first direction with respect to the first canting plane and in the second direction with respect to the second canting plane independently of one another; and
   wherein angle a and angle a' represent angle values with respect to the first canting plane and angle b, and angle b' represent angle values with respect to the second canting plane.

8. The seal assembly of claim 7, further comprising a retaining member engaging the sealing component.

* * * * *